(12) United States Patent
Mitani et al.

(10) Patent No.: US 11,778,325 B2
(45) Date of Patent: Oct. 3, 2023

(54) IMAGE PROCESSING APPARATUS, IMAGE PROCESSING METHOD, AND IMAGE PROCESSING PROGRAM

(71) Applicant: Sony Group Corporation, Tokyo (JP)

(72) Inventors: Hitoshi Mitani, Kanagawa (JP); Masafumi Wakazono, Tokyo (JP); Tomoki Numata, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 14 days.

(21) Appl. No.: 17/496,026

(22) Filed: Oct. 7, 2021

(65) Prior Publication Data

US 2022/0070381 A1 Mar. 3, 2022

Related U.S. Application Data

(63) Continuation of application No. 16/642,548, filed as application No. PCT/JP2018/029784 on Aug. 8, 2018, now Pat. No. 11,206,355.

(30) Foreign Application Priority Data

Sep. 8, 2017 (JP) .................................. 2017-173255

(51) Int. Cl.
*H04N 23/69* (2023.01)
*G06T 5/00* (2006.01)
*H04N 23/80* (2023.01)
*H04N 23/67* (2023.01)

(52) U.S. Cl.
CPC ............. *H04N 23/69* (2023.01); *G06T 5/002* (2013.01); *H04N 23/673* (2023.01); *H04N 23/80* (2023.01)

(58) Field of Classification Search
CPC .... H04N 5/2357; H04N 5/2353; H04N 5/345; H04N 5/35563; H04N 5/3696; H04N 5/369; H04N 5/341; H04N 23/69; H04N 23/673; H04N 23/80; H04N 23/76; H01L 27/14605; H01L 27/1461; H01L 27/14621; H01L 27/14623; H01L 27/1463; H01L 27/1464; H01L 27/14645; H01L 27/14612; H01L 27/14607; H01L 27/14625; G06T 5/002; G06T 5/003
See application file for complete search history.

(56) References Cited

U.S. PATENT DOCUMENTS

| | | | | |
|---|---|---|---|---|
| 5,933,187 A * | 8/1999 | Hirasawa | ......... | H04N 5/232123 348/240.99 |
| 6,538,694 B1 * | 3/2003 | Miyahara | ............... | G06T 3/4007 348/241 |
| 6,650,790 B1 * | 11/2003 | Arbeiter | .................. | G06T 3/403 345/611 |
| 6,717,622 B2 * | 4/2004 | Lan | ........................... | G06T 7/13 348/E5.064 |

(Continued)

FOREIGN PATENT DOCUMENTS

| JP | 2015-034869 A | 2/2015 |
|---|---|---|
| JP | 2015-216467 A | 12/2015 |

(Continued)

*Primary Examiner* — Chiawei Chen
(74) *Attorney, Agent, or Firm* — Michael Best & Friedrich LLP

(57) ABSTRACT

An image processing apparatus adjusts a band of a filter that extracts a high-frequency component from frequency characteristics of an image according to a change in imaging setting.

19 Claims, 22 Drawing Sheets

(56) References Cited

U.S. PATENT DOCUMENTS

| | | | | |
|---|---|---|---|---|
| 7,065,262 B1* | 6/2006 | Silver | | G06T 7/75 382/209 |
| 8,385,671 B1* | 2/2013 | Batur | | G06T 5/002 382/254 |
| 9,213,875 B1* | 12/2015 | Nadabar | | G06K 7/10702 |
| 2002/0140854 A1* | 10/2002 | Lan | | H04N 7/012 348/625 |
| 2003/0095693 A1* | 5/2003 | Kaufman | | G06T 5/20 382/280 |
| 2004/0223662 A1* | 11/2004 | Urano | | G06T 3/4084 382/299 |
| 2008/0049124 A1* | 2/2008 | Tanizoe | | H04N 5/23296 348/240.99 |
| 2008/0091102 A1* | 4/2008 | Maeda | | A61B 6/583 600/436 |
| 2008/0143881 A1* | 6/2008 | Tsukioka | | H04N 9/04557 348/E9.042 |
| 2008/0218635 A1* | 9/2008 | Tsuruoka | | G06T 5/003 386/E5.067 |
| 2008/0219506 A1* | 9/2008 | Wiedemann | | G06V 30/2504 382/103 |
| 2008/0266432 A1* | 10/2008 | Tsuruoka | | G06T 5/002 348/E5.064 |
| 2008/0278602 A1* | 11/2008 | Otsu | | H04N 9/04515 348/E3.02 |
| 2009/0201410 A1* | 8/2009 | Nishiguchi | | H04N 5/232123 348/E5.045 |
| 2009/0290067 A1* | 11/2009 | Ishiga | | H04N 1/409 348/607 |
| 2009/0322891 A1* | 12/2009 | Kondo | | G06T 3/4053 348/E5.024 |
| 2010/0182495 A1* | 7/2010 | Murata | | H04N 5/23212 348/349 |
| 2011/0018877 A1* | 1/2011 | Hwang | | G06T 3/4061 345/428 |
| 2011/0096201 A1* | 4/2011 | Yoo | | H04N 5/2355 348/E9.053 |
| 2012/0287143 A1* | 11/2012 | Brown Elliott | | G09G 3/3413 345/589 |
| 2013/0027510 A1* | 1/2013 | Tsubusaki | | H04N 5/23296 348/E7.001 |
| 2013/0250145 A1* | 9/2013 | Miura | | H04N 5/232123 348/239 |
| 2014/0049628 A1* | 2/2014 | Motomura | | G06T 3/40 348/77 |
| 2014/0210972 A1* | 7/2014 | On | | A61B 1/00096 348/349 |
| 2015/0092085 A1* | 4/2015 | Nakade | | G06T 5/002 348/241 |
| 2015/0326797 A1* | 11/2015 | Ohyama | | G06T 5/003 348/239 |
| 2016/0142619 A1* | 5/2016 | Kanda | | H04N 23/673 348/352 |
| 2017/0139308 A1* | 5/2017 | Minakuti | | G03B 7/18 |
| 2018/0048812 A1* | 2/2018 | Tanioka | | H04N 5/23212 |
| 2018/0139395 A1* | 5/2018 | Toyoda | | H04N 5/23222 |
| 2019/0052862 A1* | 2/2019 | Zhao | | H04N 13/246 |
| 2019/0141251 A1* | 5/2019 | Ardo | | H04N 5/2353 |

FOREIGN PATENT DOCUMENTS

| | | |
|---|---|---|
| JP | 2016-057349 A | 4/2016 |
| WO | 2016/203685 A1 | 12/2016 |

\* cited by examiner $g = \alpha \cdot f(i) + (1-\alpha) \cdot f(i+1))$

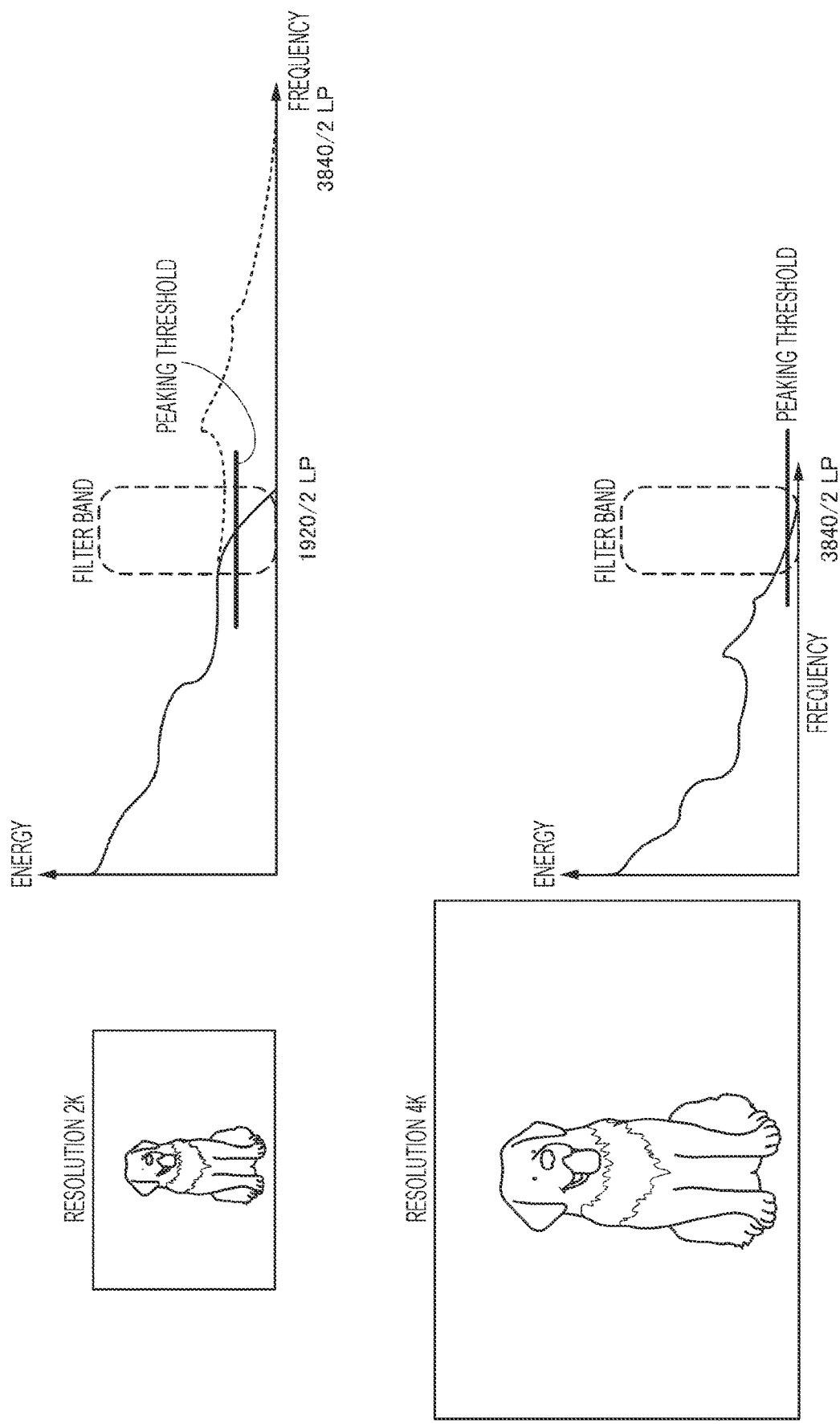

FIG. 13A

|  | PEAKING SENSITIVITY | | |
|---|---|---|---|
|  | HIGH | MEDIUM | LOW |
| RESOLUTION 4K | TABLE 00 | TABLE 01 | TABLE 02 |
| RESOLUTION 2K | TABLE 10 | TABLE 11 | TABLE 12 |

FIG. 13B

DIGITAL ZOOM x1

| TABLE xy | OPTICAL ZOOM x1 | OPTICAL ZOOM x2 | OPTICAL ZOOM x4 |
|---|---|---|---|
| ISO100 | fxy(0,0,0) | fxy(0,0,1) | fxy(0,0,2) |
| ISO800 | fxy(0,1,0) | fxy(0,1,1) | fxy(0,1,2) |
| ISO6400 | fxy(0,2,0) | fxy(0,2,1) | fxy(0,2,2) |

DIGITAL ZOOM x4

| TABLE xy | OPTICAL ZOOM x1 | OPTICAL ZOOM x2 | OPTICAL ZOOM x4 |
|---|---|---|---|
| ISO100 | fxy(1,0,0) | fxy(1,0,1) | fxy(1,0,2) |
| ISO800 | fxy(1,1,0) | fxy(1,1,1) | fxy(1,1,2) |
| ISO6400 | fxy(1,2,0) | f(xy1,2,1) | fxy(1,2,2) |

$$\begin{aligned}g = \quad &\gamma \cdot ( \quad \alpha \quad \cdot (\beta \cdot fxy(i,j,k) + (1-\beta) \cdot fxy(i,j+1,k))\\ &+ (1-\alpha) \cdot (\beta \cdot fxy(i+1,j,k) + (1-\beta) \cdot fxy(i+1,j+1,k)))\\ + (1-\gamma) \cdot ( &\quad \alpha \quad \cdot (\beta \cdot fxy(i,j,k+1) + (1-\beta) \cdot fxy(i,j+1,k+1))\\ &+ (1-\alpha) \cdot (\beta \cdot fxy(i+1,j,k+1) + (1-\beta) \cdot fxy(i+1,j+1,k+1)))\end{aligned}$$

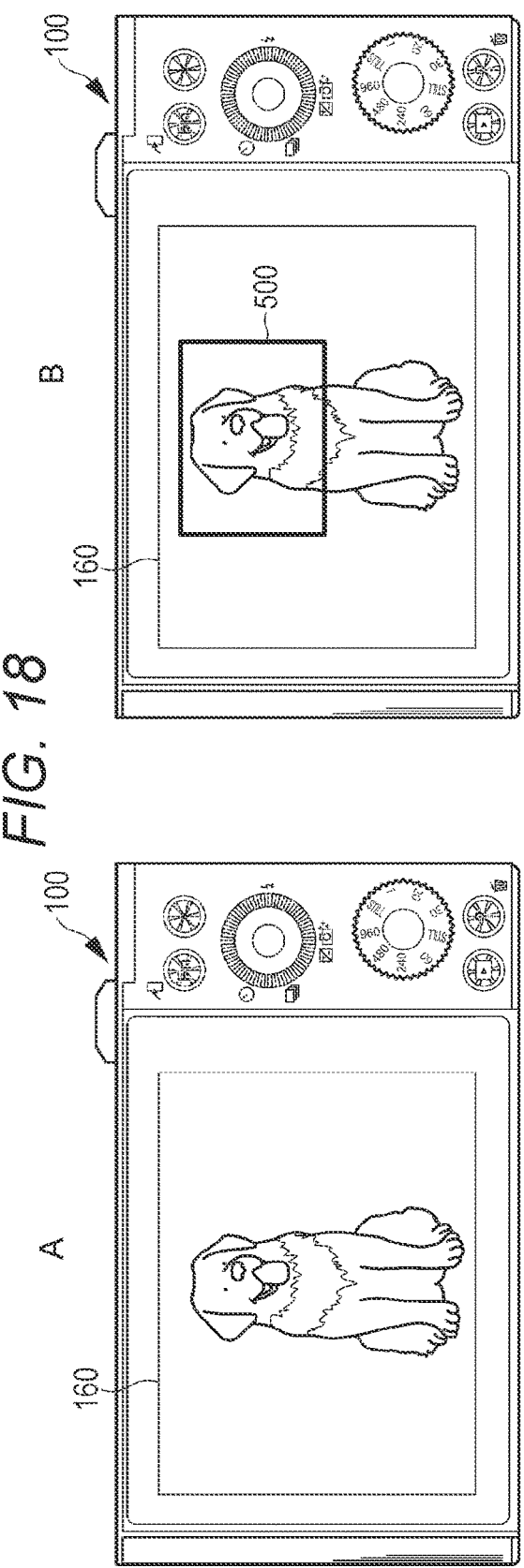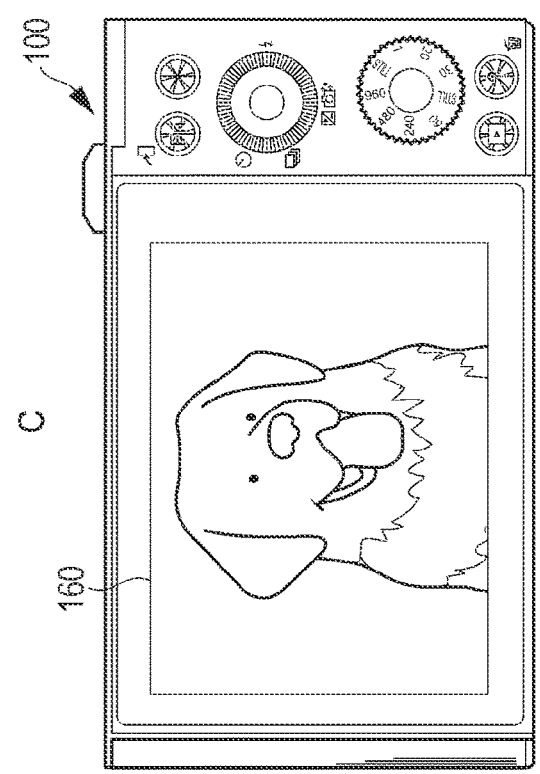
FIG. 18

IMAGE PROCESSING APPARATUS, IMAGE PROCESSING METHOD, AND IMAGE PROCESSING PROGRAM

CROSS REFERENCES TO RELATED APPLICATIONS

This application is a Continuation Application of patent application Ser. No. 16/642,548, filed Feb. 27, 2020, which is the U.S. national stage entry under 35 U.S.C. § 371 of International Application No. PCT/JP2018/029784, filed Aug. 8, 2018, which claims priority to Japanese Patent Application JP 2017-173255 filed in the Japan Patent Office on Sep. 8, 2017, the entire contents of which being incorporated herein by reference.

TECHNICAL FIELD

The present technology relates to an image processing apparatus, an image processing method, and an image processing program.

BACKGROUND ART

In manual focus of a digital camera or video camera, a cameraman moves the focus position of the lens and performs a focusing operation by searching for a focus position where a subject is sharpest on a monitoring image. In focusing, there is an assist function called peaking to increase the accuracy. The peaking function displays a linear marker as an auxiliary signal at a sharp portion on the monitoring image. The cameraman can focus by searching for the focus position where the marker display on the subject is the largest.

However, if there is a difference between the settings of the imaging apparatus, for example, the resolution of an image and the resolution of an image display monitor, the peaking marker is also subjected to resolution conversion processing, and in a case where the resolution of an output apparatus is lower than the resolution of the image, the marker can be difficult to see. Furthermore, peaking may not be performed properly depending on the setting of the imaging apparatus, for example, a change in zoom magnification.

On the other hand, there has been proposed a technique for performing processing of thickening the marker (thickening processing) in a case where the resolution of a display unit is lower than the resolution of an image (Patent Document 1). Furthermore, the phenomenon that the peaking marker becomes difficult to see occurs also in a case where, for example, the parameters of the imaging apparatus at the time of capturing such as zoom magnification are changed, and thus it is necessary to make improvement. On the other hand, a technique for adjusting the sensitivity of peak detection according to a change in zoom magnification has been proposed (Patent Document 2).

CITATION LIST

Patent Document

Patent Document 1: Japanese Patent Application Laid-Open No. 2015-216467
Patent Document 2: WO 2016/203685 A1

SUMMARY OF THE INVENTION

Problems to be Solved by the Invention

However, there is still room for improvement in solving the phenomenon that the peaking marker becomes difficult to see.

The present technology has been made in view of such a problem, and it is an object of the present technology to provide an image processing apparatus, an image processing method, and an image processing program that adjust peaking settings according to a change in settings of an imaging apparatus.

Solutions to Problems

In order to solve the above-described problem, a first technique is an image processing apparatus that adjusts a band of a filter that extracts a high-frequency component from frequency characteristics of an image according to a change in imaging setting.

Furthermore, a second technique is an image processing method including adjusting a band of a filter that extracts a high-frequency component from frequency characteristics of an image according to a change in imaging setting.

Moreover, a third technique is an image processing program for causing a computer to execute an image processing method including adjusting a band of a filter that extracts a high-frequency component from frequency characteristics of an image according to a change in imaging setting.

Effects of the Invention

According to the present technology, it is possible to adjust peaking settings according to a change in settings of the imaging apparatus. Note that effects described herein are not necessarily limited, but may also be any of those described in the specification.

BRIEF DESCRIPTION OF DRAWINGS

FIG. 11 is a diagram for explaining adjustment of peaking settings with respect to a change in resolution.
FIGS. 13A and 13B are diagrams illustrating an example of a table in which a plurality of imaging settings and peaking settings are associated with each other.

FIG. 18 is an explanatory diagram of an enlargement display function.

MODE FOR CARRYING OUT THE INVENTION

Embodiments of the present technology are described below with reference to the drawings. In FIGS. 4, 5, 8 and 11, the passband of a filter is schematically indicated by a dotted square, and the relative magnitude of a peaking threshold is indicated by a horizontal line.

<1. First Embodiment>
[1-1. Configuration of the imaging apparatus]
[1-2. Peaking setting adjustment according to imaging settings]
{1-2-1. Peaking setting adjustment according to zoom}
{1-2-2. Peaking setting adjustment according to the amount of noise}
{1-2-3. Peaking setting adjustment according to resolution}
[1-3. Peaking setting adjustment according to a plurality of imaging settings]
<2. Second Embodiment>
[2-1. Configuration of the peaking processing unit]
<3. Variation>
<4. Application example>

1. FIRST EMBODIMENT

[1-1. Configuration of the Imaging Apparatus]

Figure 1:
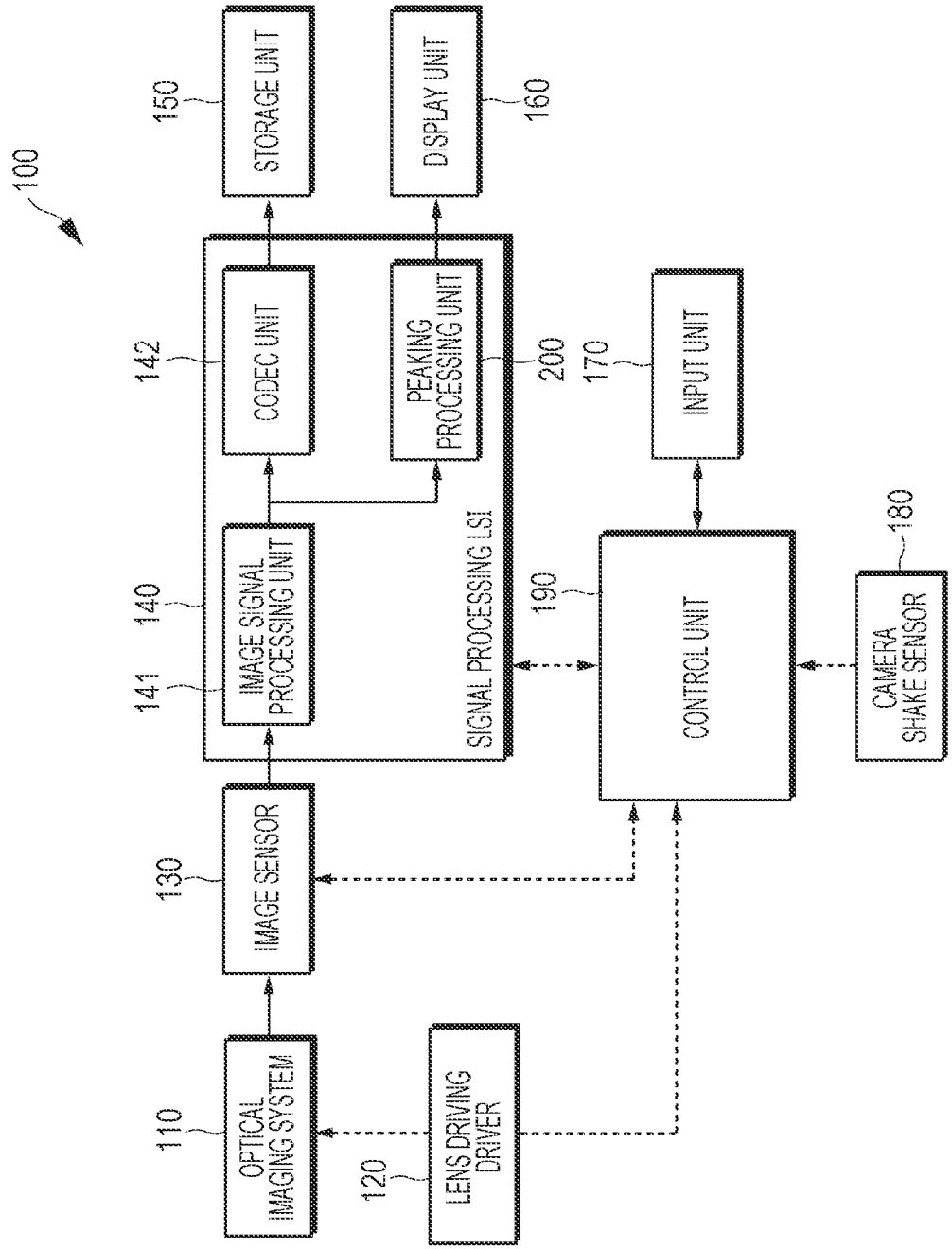
FIG. 1 is a block diagram illustrating a configuration of an imaging apparatus.

First, the configuration of an imaging apparatus 100 including a peaking processing unit 200 as an image processing apparatus according to the first embodiment will be described. FIG. 1 is a block diagram illustrating a configuration of the imaging apparatus 100.

The imaging apparatus 100 includes an optical imaging system 110, a lens driving driver 120, an image sensor 130, a signal processing large-scale integration (LSI) 140, an image signal processing unit 141, a codec unit 142, a peaking processing unit 200, a storage unit 150, a display unit 160, an input unit 170, a camera shake sensor 180, and a control unit 190.

The optical imaging system 110 includes a lens for condensing light from a subject into the image sensor 130, a drive mechanism, a shutter mechanism, an iris mechanism and the like that move the lens and perform focusing or zooming. These are driven on the basis of control signals from the control unit 190 and the lens driving driver 120. An optical image of the subject obtained via the optical imaging system 110 is formed on the image sensor 130, which is an imaging device.

The lens driving driver 120 is configured by, for example, a microcomputer, and controls operations of the drive mechanism, shutter mechanism, iris mechanism, and the like of the optical imaging system 110 according to the control of the control unit 190. Thus, exposure time (shutter speed) is adjusted, and an aperture value (F value) or the like is adjusted.

The image sensor 130 photoelectrically converts incident light from the subject into an electric charge amount and outputs it as an analog imaging signal. The analog imaging signal output from the image sensor 130 is output to the image signal processing unit 141. As the image sensor 130, a charge coupled device (CCD), a complementary metal oxide semiconductor (CMOS), or the like is used.

The image signal processing unit 141 performs sample and hold for keeping signal/noise (S/N) ratio favorable by correlated double sampling (CDS), auto gain control (AGC) processing, analog/digital (A/D) conversion, or the like on the imaging signal output from the image sensor 130 so as to generate an image signal.

Furthermore, the image signal processing unit 141 may perform predetermined signal processing on the image signal, including demosaic processing, white balance adjustment processing, color correction processing, gamma correction processing, Y/C conversion processing, auto exposure (AE) processing, resolution conversion processing, or the like.

The codec unit 142 performs, for example, encoding processing for recording or communication on the image signal on which the predetermined processing has been performed.

The peaking processing unit 200 performs peaking processing on the basis of peaking settings corresponding to imaging settings. Peaking is processing of detecting a high-frequency component in an image to identify a focused portion of a subject and emphasizing and displaying pixels constituting an edge portion (for example, a pattern or an outline) of the subject. Emphasizing of the pixels constituting the edge portion is performed by increasing the number of lines along the edge portion of the subject or thickening the lines along the contour of the subject thicker by drawing the pixels with a marker of a predetermined color.

The peaking setting for peaking includes a filter band having a predetermined filter coefficient for extracting a high-frequency component from the image, and reaction sensitivity for detecting a peak signal in comparison with the energy of the high-frequency component in the image. The reaction sensitivity is adjusted by increasing or reducing the filter gain or peaking threshold. In order to increase the reaction sensitivity, the filter gain is increased or the peaking threshold is reduced. In order to reduce the reaction sensitivity, the filter gain is reduced or the peaking threshold is increased. In the following description, it is assumed that the reaction sensitivity is adjusted by increasing or reducing the peaking threshold. In a case where the energy of the high-frequency component in the image exceeds the peaking threshold, emphasizing processing by peaking is performed. This peaking includes high-frequency component extraction processing using a filter having a predetermined filter coefficient, comparison processing between the extracted high-frequency component energy and the peaking threshold, and peaking drawing processing that emphasizes a pixel in which the high-frequency component energy is determined to be larger than the peaking threshold. In order to perform peaking with high accuracy, it is necessary to extract high-frequency components with a filter as much as possible. Peaking can emphasize the subject that is in focus on the image. Therefore, the user can easily focus by focusing so that the number of points emphasized by peaking increases.

The peaking processing unit 200 adjusts the filter band and the peaking threshold as peaking settings on the basis of imaging settings. Imaging settings include zoom magnification, settings that affect noise on the image, image resolution, and the like. Details of the imaging setting and peaking setting will be described later.

Note that the peaking setting adjustment based on the imaging settings may be performed by the peaking processing unit 200 itself or by a peaking setting adjustment-dedicated processing unit configured separately from the peaking processing unit 200. Alternatively, the control unit 190 may perform the peaking setting adjustment processing.

The storage unit 150 is a large-capacity storage medium such as a hard disk, a memory stick (registered trademark of Sony Corporation), an SD memory card, and the like. The image is saved in a compressed state on the basis of a standard, for example, joint photographic experts group (JPEG) or the like. Furthermore, exchangeable image file format (EXIF) data including information associated with the stored image and additional information, e.g., date and time of imaging, is also stored in association with the image. A video is stored, for example, in format of moving picture experts group 2 (MPEG2) or MPEG 4.

The display unit 160 is a display device including, for example, a liquid crystal display (LCD), plasma display panel (PDP), an organic electro luminescence (EL) panel, and the like. The display unit 160 displays a user interface of the imaging apparatus 100, a menu screen, a monitoring image during imaging, a captured image or a captured video recorded on the storage unit 150, or the like.

The input unit 170 includes, for example, a power button for switching power on/off, a release button for instructing start of image recording, a zoom lever for zoom adjustment, a touch screen configured integrally with the display unit 160, and the like. When the input is made on the input unit 170, a control signal corresponding to the input is generated and output to the control unit 190. Then, the control unit 190 performs arithmetic processing or control corresponding to the control signal.

The camera shake sensor 180 detects camera shake during imaging using, for example, an acceleration sensor or an angular velocity sensor with respect to the biaxial direction, and supplies camera shake information to the control unit 190. The control unit 190 performs camera shake correction control on the basis of camera shake information from the camera shake sensor.

The control unit 190 includes a central processing unit (CPU), a random access memory (RAM), a read only memory (ROM), and the like. The ROM stores a program or the like that is read and operated by the CPU. The RAM is used as a work memory of the CPU. The CPU executes various processing according to a program stored in the ROM and issues a command to generally control the imaging apparatus 100.

Note that the peaking processing unit 200 includes a program, which may be pre-installed in the imaging apparatus 100 or may be distributed through download or via a storage medium and installed by the user itself. The control unit 190 may function as the peaking processing unit 200 when the control unit 190 executes the program or the control unit 190 may be configured independently. Furthermore, the peaking processing unit 200 may have the function as the peaking processing unit 200. Note that the peaking processing unit 200 is not only achieved by the program, but may be achieved by a combination of a dedicated apparatus, circuit, and the like of hardware having the function of the program.

The imaging apparatus 100 is configured in the aforementioned manner.

Figure 2:
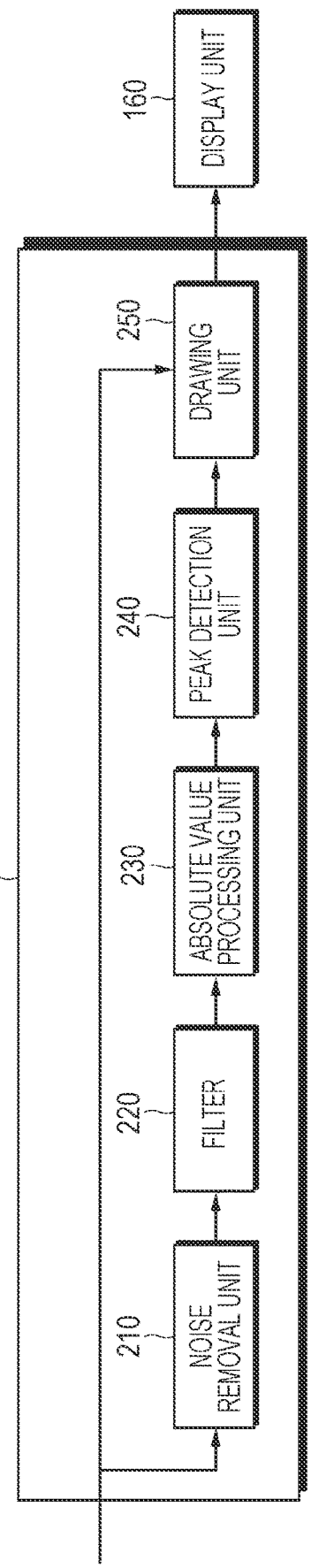
FIG. 2 is a block diagram illustrating a configuration of a peaking processing unit according to a first embodiment.

Next, the configuration of the peaking processing unit 200 will be described with reference to FIG. 2. The peaking processing unit 200 includes a noise removal unit 210, a filter 220, an absolute value processing unit 230, a peak detection unit 240, and a drawing unit 250.

The noise removal unit 210 sets a noise removal threshold with respect to the energy in the image, and performs low-level edge component removal, high-frequency component noise removal, and the like.

The filter 220 is a high-pass filter having a predetermined filter coefficient, for example, and extracts an edge component that is a high-frequency component of the image. The absolute value processing unit 230 performs an absolute value processing of the image. The band of the filter as the peaking setting described above is the band of the filter 220.

The peak detection unit 240 compares the peaking threshold with the energy of the high-frequency component of the image, and detects a peak signal that is equal to or greater than the peaking threshold. The peaking threshold as the peaking setting described above is a threshold used for peak signal detection in the peak detection unit 240.

The drawing unit 250 performs peaking drawing processing for emphasizing pixels for which it is determined by a comparison with the peaking threshold that the energy of the high-frequency component is greater than the peaking threshold. In the present technology, the drawing processing detects a high-frequency component in an image, specifies a focused portion of the subject, draws a marker on a pixel constituting an edge portion (for example, a pattern or an outline) of the subject, and emphasizes a focused portion of the subject.

The peaking processing unit 200 is configured as described above. The peaking processing unit 200 adjusts the band of the filter 220 and the peaking threshold in the peak detection unit 240 as peaking settings according to the imaging settings of the imaging apparatus 100.

[1-2. Peaking Setting Adjustment According to Imaging Settings]

{1-2-1. Peaking Setting Adjustment According to Zoom}

Next, adjustment of peaking setting according to zoom magnification, which is one of imaging settings of the imaging apparatus 100, will be described. Usually, the zoom function of the imaging apparatus 100 includes so-called optical zoom and digital zoom. The optical zoom is to optically enlarge a subject by changing a focal length by moving a lens. The digital zoom is to enlarge the subject by enlarging a part of the image by image processing without moving the lens itself.

Figure 3:
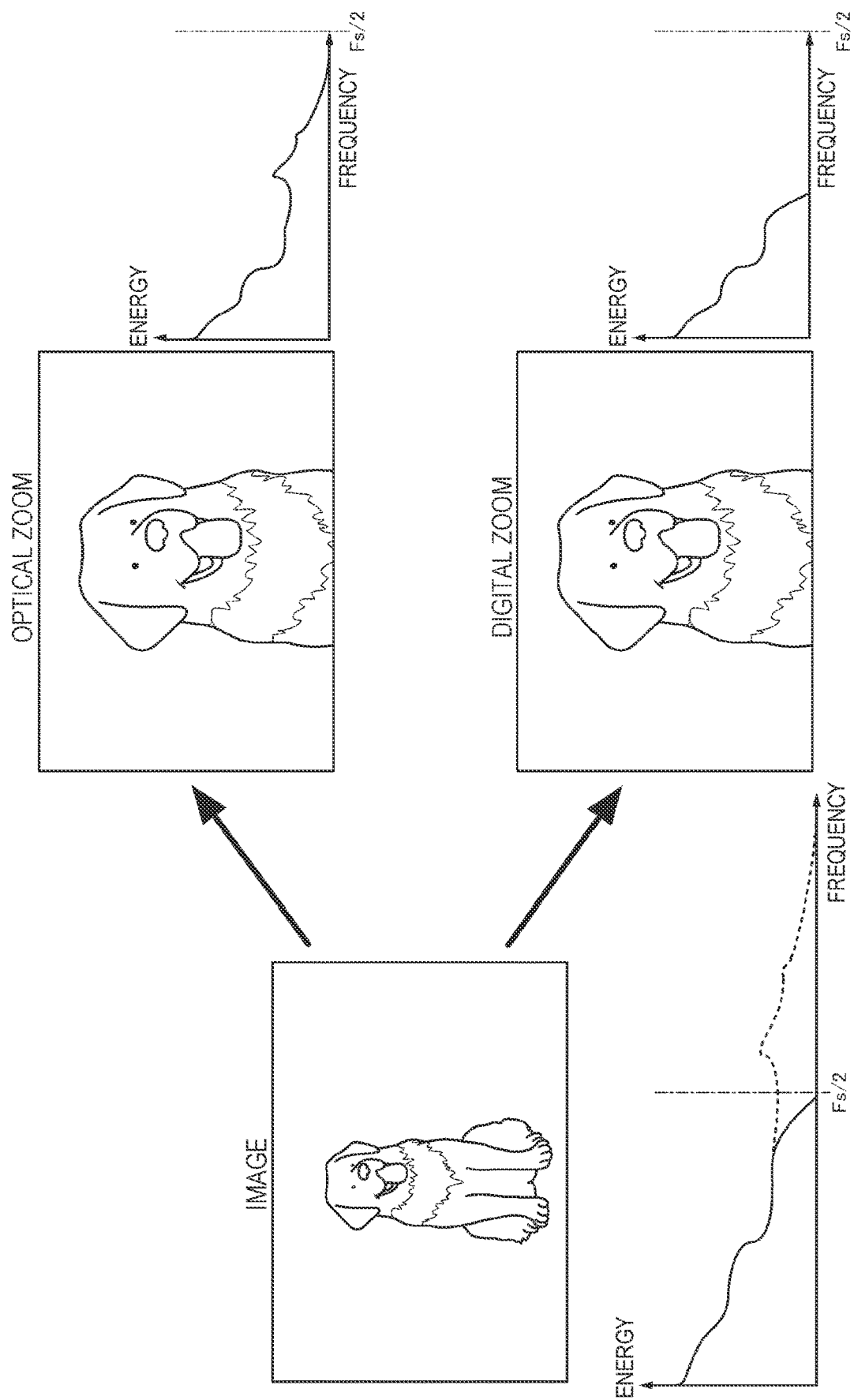
FIG. 3 is a diagram illustrating changes in frequency characteristics due to optical zoom and digital zoom.

In FIG. 3, the graphs arranged next to images illustrate the frequency characteristics of the images. As illustrated in FIG. 3, in the optical zoom, even if the zoom is performed, the change in the frequency characteristic of the subject in the image is small, but the energy changes according to the change in the zoom magnification. Normally, when zooming in, the energy of the subject image decreases in the high-frequency component, and when zooming out, the energy of the subject image shifts to the high frequency side. Furthermore, in the digital zoom, the energy of the subject is shifted to the low frequency side by zooming in.

As described above, the peaking is performed by comparing the energy of the high-frequency component extracted by the filter 220 with the peaking threshold and drawing a marker at the position of the pixel for which the energy of the high-frequency component is determined to be larger than the peaking threshold. Therefore, in a case where the energy of the high-frequency component changes due to the zooming in/out of the optical zoom, the peaking marker can be appropriately drawn and displayed by adjusting the peaking threshold accordingly.

Figure 4:
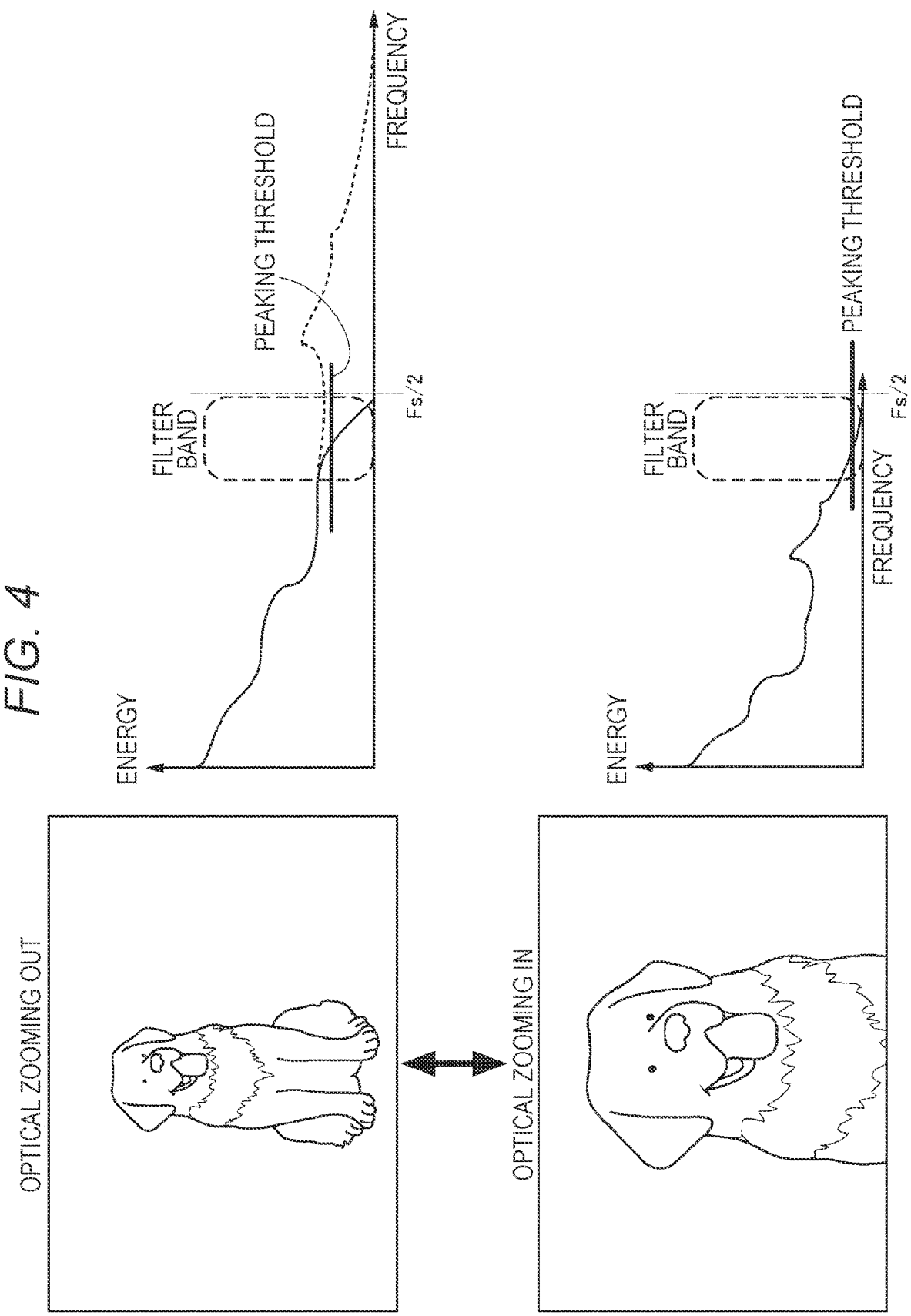
FIG. 4 is a diagram for explaining adjustment of peaking settings with respect to a change in optical zoom magnification.

As illustrated in FIG. 4, in the case of zooming in with the optical zoom, the energy of high-frequency component decreases. Therefore, in order to perform proper peaking, it is necessary to adjust the peaking threshold to a small value. Furthermore, in the case of zooming out with the optical zoom, the energy of the high-frequency component increases. Therefore, in order to perform appropriate peaking, it is necessary to adjust the peaking threshold to a large value.

Figure 5:
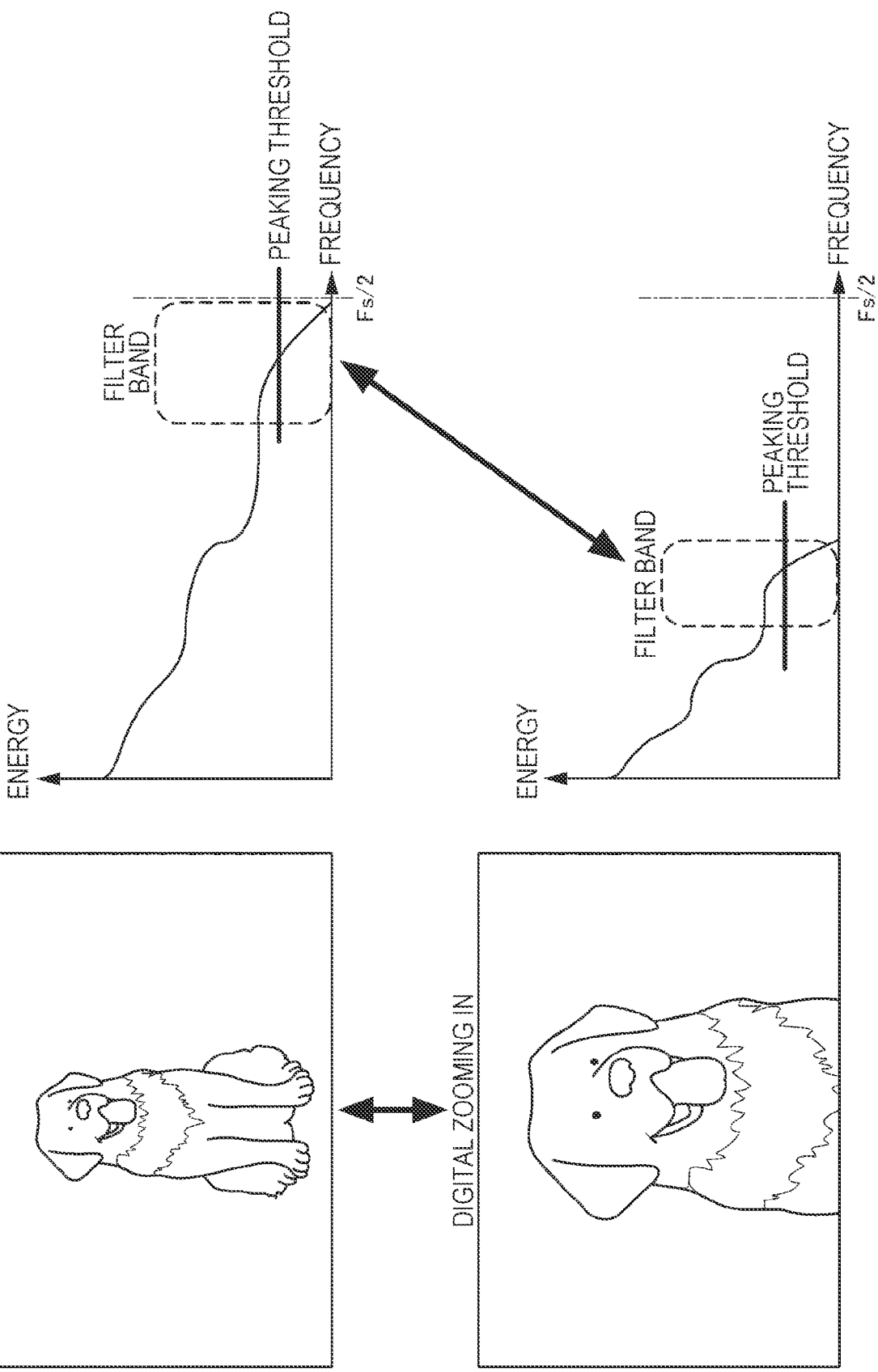
FIG. 5 is a diagram for explaining adjustment of peaking settings with respect to a change in digital zoom magnification.

On the other hand, with the digital zoom, part of the image is complemented and enlarged by image processing, and the image becomes rough. As illustrated in FIG. 5, the energy of the subject in the image shifts to the low frequency side, and the frequency characteristics of the subject (mainly high-frequency components) will be damaged. Therefore, if the preset band of the filter 220 is kept, there is a possibility that the edge component, which is a high-frequency component of the image, cannot be extracted because there is no (or small) energy in the band of the filter 220.

Therefore, in a case where the energy of the subject shifts to the low frequency side due to the digital zoom and the energy of the high-frequency component decreases (or does not exist), as illustrated in FIG. 5, the pass frequency band of the filter 220 is adjusted and shifted to the low frequency side. Thus, the peaking can be appropriately performed by extracting the energy of the high-frequency component in the existing frequency component and comparing the energy with the peaking threshold to detect the peak signal. Note that when the pass frequency band of the filter 220 is shifted to the low frequency side, the bandwidth of the filter 220 may be narrowed. Since the filter 220 has shifted to the low frequency side, it is possible to prevent an extra low frequency component from passing through by narrowing the bandwidth of the filter 220.

Next, processing for applying the peaking setting according to the zoom magnification adjusted as described above to the peaking processing unit 200 will be described. Here, for the sake of convenience of explanation, it is assumed that the imaging apparatus 100 has a zoom magnification of ×1 to ×4 in the optical zoom and also has a zoom magnification of ×1 to ×4 in the digital zoom.

Figure 6:
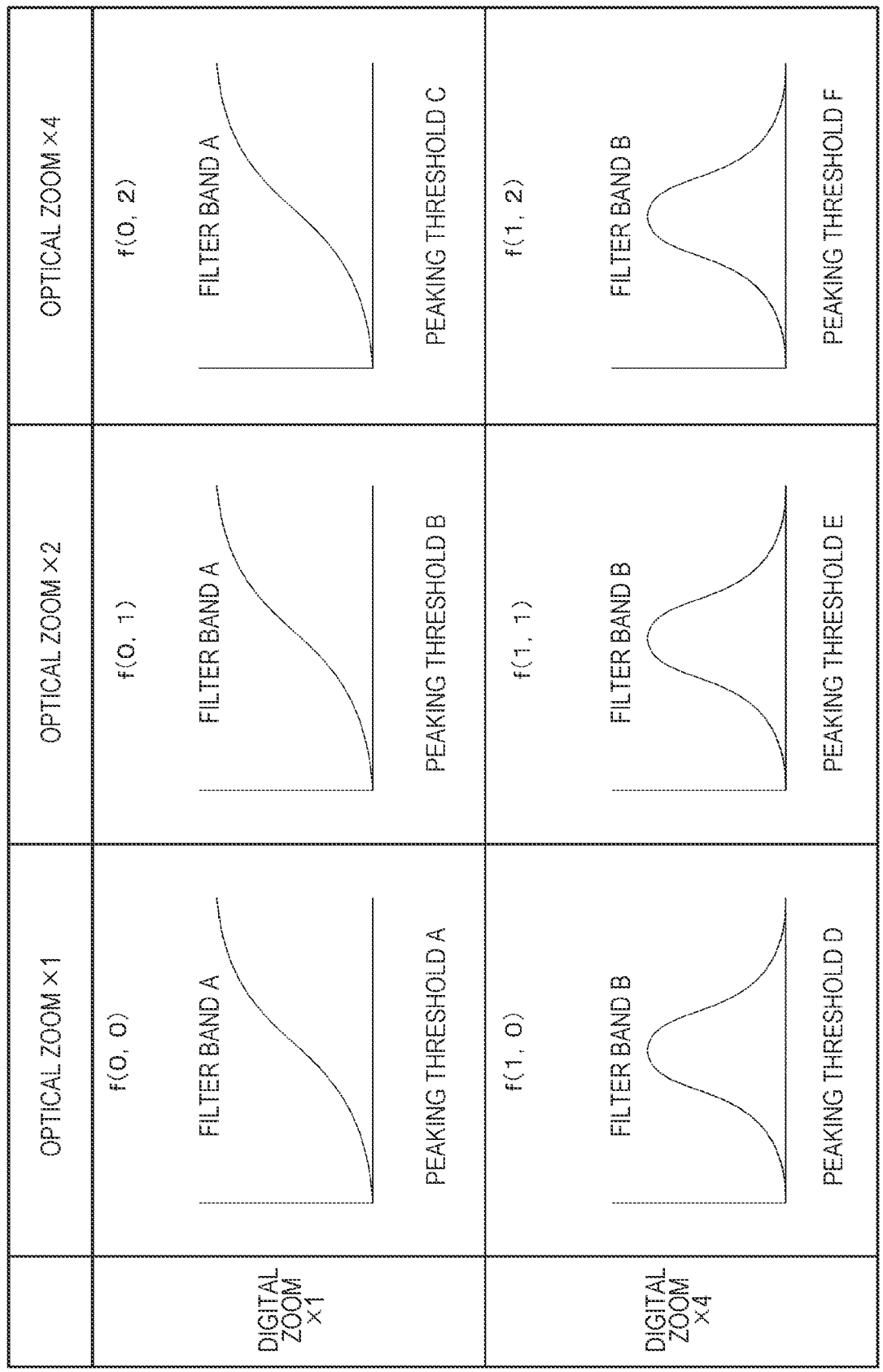
FIG. 6 is a diagram illustrating an example of a table in which zoom magnification and peaking settings are associated with each other.

In general, a user performs imaging using both the optical zoom and the digital zoom. Therefore, as illustrated in the table of FIG. 6, the band of the filter 220 and the peaking threshold are associated with each of combinations of the magnifications of the digital zoom and optical zoom. In the table of FIG. 6, as an example, the band of the filter 220 and the peaking threshold are associated with each of the combinations of ×1, ×2, and ×4 of the optical zoom and ×1 and ×4 of the digital zoom. In the table of FIG. 6, the combinations are illustrated in the form of f(i,j).

As described above, the peaking threshold is changed with respect to the change in the optical zoom magnification, and the band of the filter 220 is changed with respect to the change in the digital zoom magnification. Note that when the band of the filter 220 is changed in association with the change in the magnification of the digital zoom, the peaking threshold also changes accordingly. This is in line with the content described regarding the peaking processing corresponding to the zoom described above.

For example, in a case where imaging with ×2 optical zoom and ×1 digital zoom, the filter band and the peaking threshold stored in the table f(0,1) are used. Furthermore, in a case where imaging with ×4 optical zoom and ×4 digital zoom, the filter band and the peaking threshold stored in table f(1,2) are used.

Note that the table is configured to correspond to combinations of ×1, ×2, and ×4 of the optical zoom and ×1 and ×4 of the digital zoom. However, imaging may be performed at other magnifications. For example, in a case of imaging with ×1.3 optical zoom and ×4 digital zoom, four peaking settings: f(0,0), f(0,1), f(1,0), f(1,1) are used. Then, the peaking setting corresponding to the zoom magnification at the time of imaging is calculated by linear interpolation.

Figure 7:
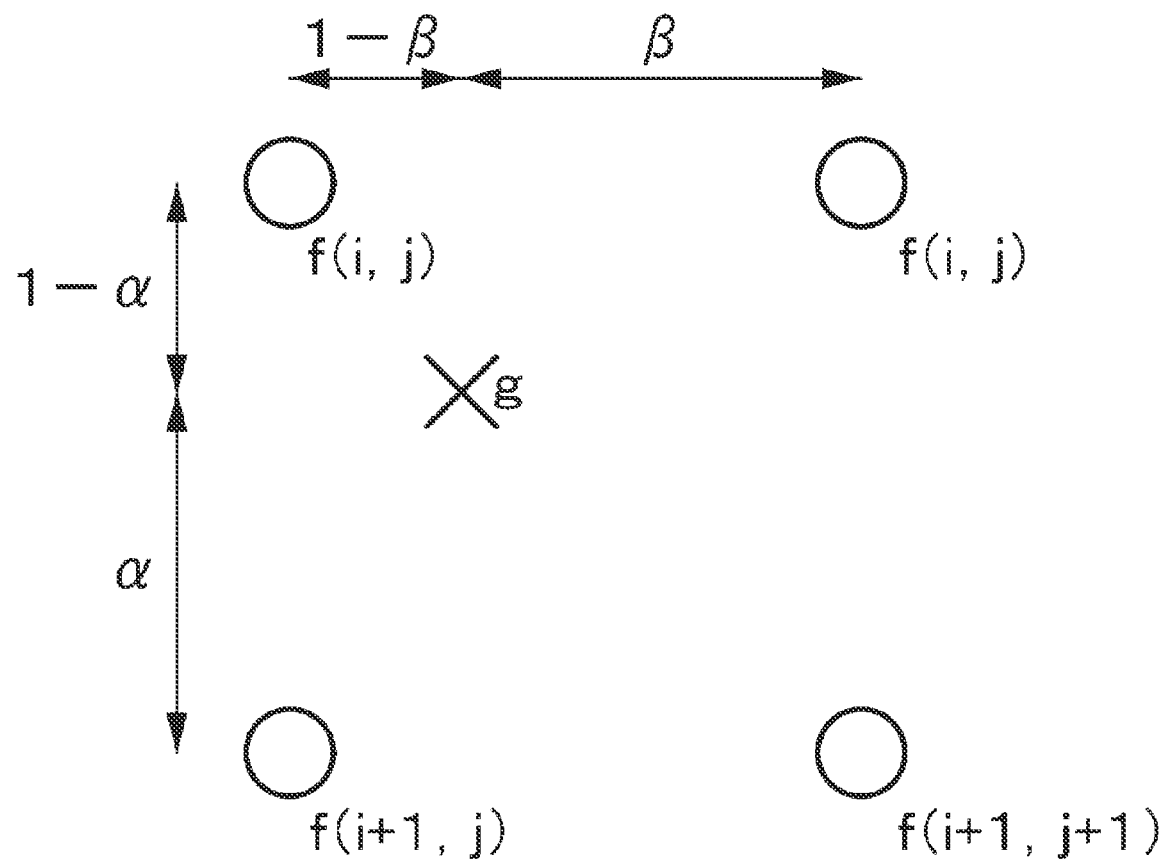
FIG. 7 is an explanatory diagram of linear interpolation.

If the calculated value by linear interpolation is g and f(i,j) is used, g is obtained by the following Formula (1) illustrated in FIG. 7.

[Formula 1]

$$g = \alpha \cdot (\beta \cdot f(i,j) + (1-\beta) \cdot f(i,j+1)) + (1-\alpha) \cdot (\beta \cdot f(i+1,j) + (1-\beta) \cdot f(i+1,j+1)) \quad (1)$$

By using interpolation calculation in this way, the peaking setting can be smoothly changed continuously instead of discretely following the change in zoom magnification, and optimal peaking corresponding to the change in zoom magnification can be performed. Furthermore, it is not necessary to prepare peaking settings and associate them with all combinations of optical zoom magnification and digital zoom magnification in advance, and it is sufficient if the minimum peaking settings are prepared. Therefore, the optimum peaking can be performed corresponding to all magnification combinations with a finite number of parameters even when the zoom magnification changes continuously in any way. Moreover, memory for storing peaking settings can be saved.

However, although the present technology does not exclude that the peaking settings are prepared in advance and associated with all zoom magnifications, it can be said that it is superior in that calculation is performed by interpolation calculation because the peaking settings can be changed smoothly. In imaging, in some cases, the zoom magnification is adjusted continuously (not discretely). Therefore, the peaking setting can be set appropriately following the zoom magnification that continuously changes in a case where calculation is performed by interpolation calculation.

{1-3-2. Peaking Setting Adjustment According to the Amount of Noise}

Next, peaking processing according to the amount of noise in the image will be described. An imaging setting that affects the amount of noise in an image includes ISO sensitivity. The ISO sensitivity is a value that represents the degree of electrical amplification (gain increase) with respect to the imaging signal from the image sensor 130, and the greater the value, the higher the degree of electrical amplification. For example, when the ISO sensitivity is doubled, the electrical signal is doubled, and when the ISO sensitivity is doubled, the amount of light hitting the image sensor 130 is halved and the exposure becomes appropriate.

Figure 8:
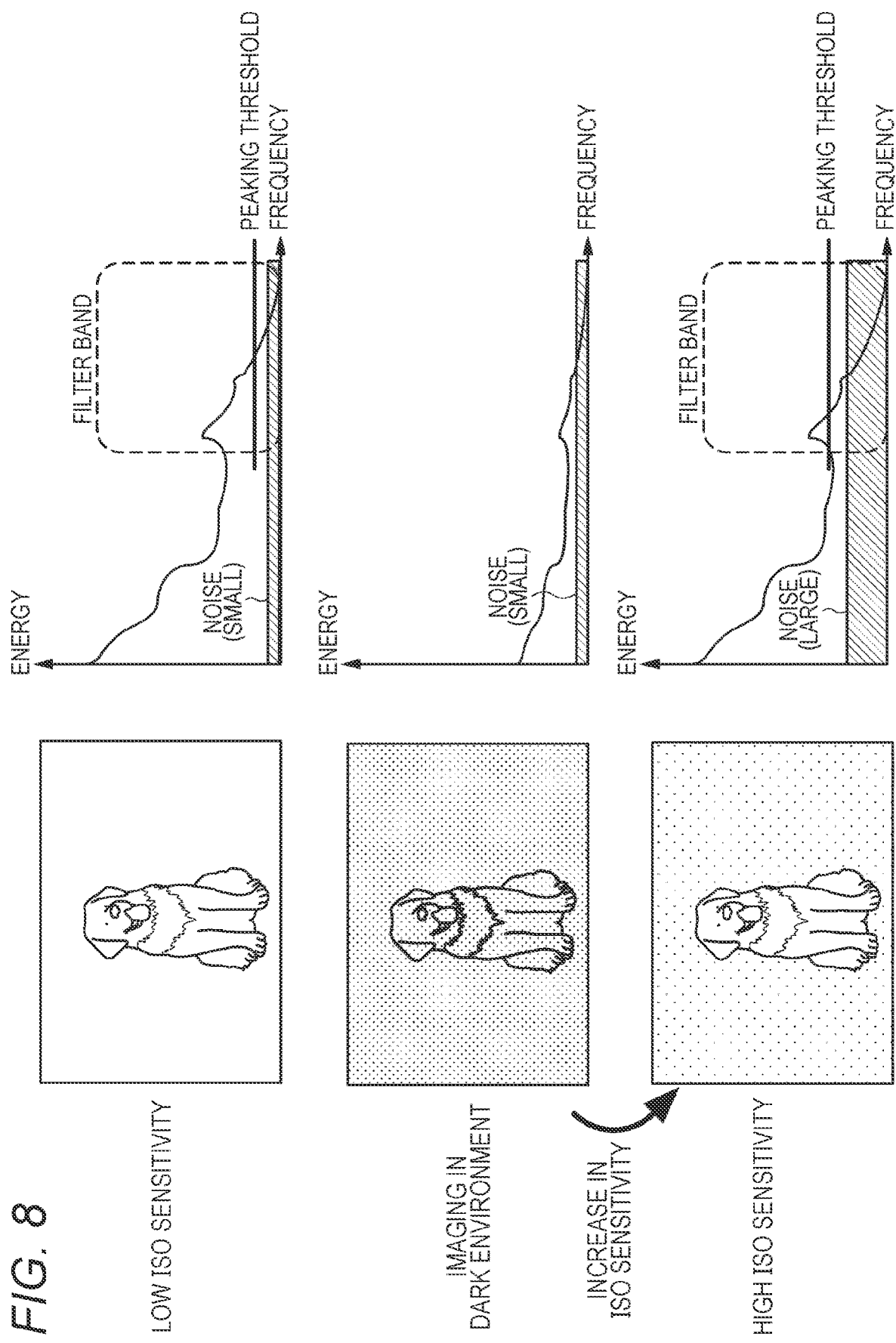
FIG. 8 is a diagram for explaining adjustment of peaking settings with respect to a change in ISO sensitivity.

For example, in a case where imaging is performed in a dark environment, it is possible to obtain an image on which the subject can be recognized in a bright state by increasing the ISO sensitivity so that the subject and the background are appropriately exposed. However, since increasing the ISO sensitivity is tantamount to an electrical amplification of the imaging signal, increasing the ISO sensitivity results in amplification of the noise in the image as illustrated in FIG. 8.

When the amplified noise exceeds the peaking threshold, the noise is erroneously detected, and the peak detection unit 240 cannot accurately extract the peak signal through comparison between the energy of the high-frequency component and the peaking threshold. Therefore, as illustrated in FIG. 8, in a case where the amount of noise increases as a result of an increase in ISO sensitivity, the peaking threshold is increased so that it is equal to or greater than the amount of noise. Thus, a comparison of the peaking threshold value can be performed within the range of equal to or more than the amount of noise of the energy of the high-frequency component.

Note that other processing that affects the amount of noise in the image include high-dynamic-range rendering (HDR), NR processing, backlight correction processing, gradation conversion processing, sharpness (high frequency) enhancement processing, and the like. Even if the amount of noise in the image changes due to these parameters/processing, the peaking processing can be performed similarly to the above.

Next, processing for applying peaking setting according to the amount of noise adjusted as described above to the peaking processing unit 200 will be described. Here, for the sake of convenience of description, it is assumed that the imaging apparatus 100 can adjust the ISO sensitivity within a range of ISO100 to ISO64000.

Figure 9:
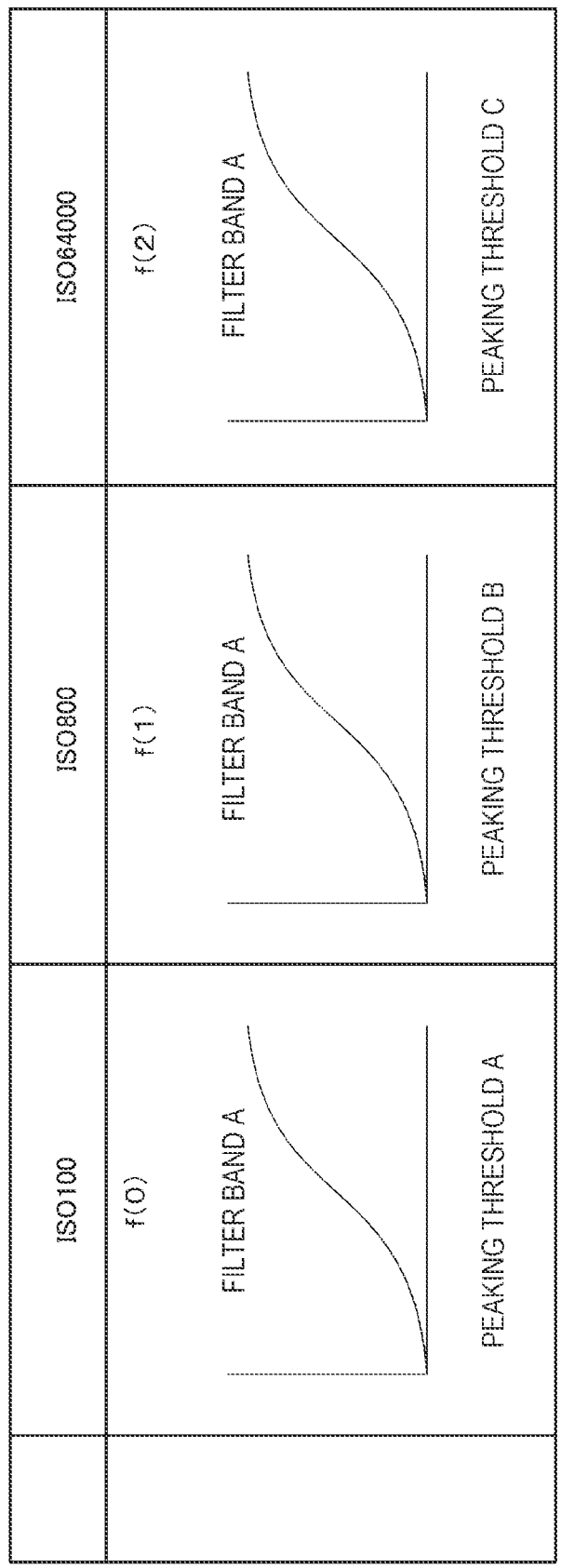
FIG. 9 is a diagram illustrating an example of a table in which ISO sensitivity and peaking settings are associated with each other.

In the present embodiment, as illustrated in FIG. 9, it is assumed that preset peaking settings are associated with each of three ISO sensitivities: ISO100, ISO800, and ISO64000 in the table. In the table of FIG. 9, peaking settings are illustrated in the form of f(i).

As described above, the peaking setting with respect to the ISO sensitivity is to adjust the peaking threshold according to the increase/decrease in the noise amount. Therefore, the peaking threshold is different, but the band of the filter 220 set for each ISO sensitivity is the same.

In a case where the ISO sensitivity set by the user is any one of ISO100, ISO800, and ISO64000, peaking is performed using the peaking setting associated therewith. However, for example, in a case where the ISO sensitivity is set to a value other than those, a peaking setting corresponding to the ISO sensitivity is calculated by linear interpolation using two peaking settings.

For example, in the case of ISO1600, an optimal peaking setting is calculated by linear interpolation from two peaking settings associated with f(1) and f(2), i.e., ISO800 and ISO64000.

Figure 10:
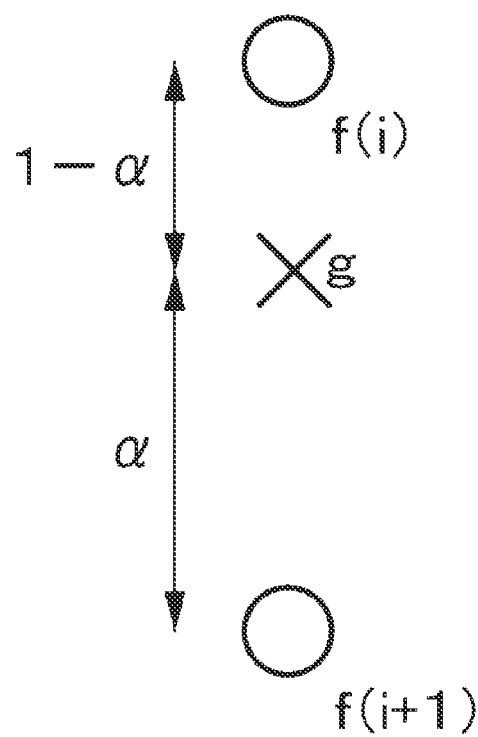
FIG. 10 is an explanatory diagram of linear interpolation.

When g is a calculated value by linear interpolation and f(i) is used, g is obtained by the following Formula (2) illustrated in FIG. 10.

[Formula 2]

$$g = \alpha \cdot f(i) + (1-\alpha) \cdot f(i+1)) \quad (2)$$

Note that the peaking setting may be calculated by spline interpolation using the three peaking settings.

By using the interpolation calculation as described above, the peaking setting can be changed smoothly and continuously not discretely according to the ISO sensitivity, and optimal peaking corresponding to the change in the ISO sensitivity can be performed. Furthermore, it is not necessary to prepare peaking settings and associate them with all ISO sensitivities in advance, but it is sufficient to prepare a finite number of peaking settings. Therefore, no matter how the continuously changing ISO sensitivity changes, optimum peaking can be performed corresponding to all ISO sensitivities with a finite number of parameters.

However, although the present technology does not exclude that the peaking settings are prepared in advance and associated with all ISO sensitivities, it can be said that a method in which calculation is performed by interpolation calculation because the peaking settings can be changed smoothly is superior. Especially in the case of a movie, the sensitivity is adjusted continuously (not discretely). Therefore, the peaking setting can be appropriately set following the ISO sensitivity that is continuously changed by the interpolation calculation. Moreover, memory for storing peaking settings can be saved.

{1-2-3. Peaking Setting Adjustment According to Resolution}

Next, peaking processing according to the image resolution, which is one of the imaging settings of the imaging apparatus 100 will be described as an example in which two types of image resolutions: 2K (1920×1080) and 4K (3840×2160) are handled. As illustrated in FIG. 11, the frequency components that can be captured differ depending on whether the image resolution is 2K or 4K, and higher frequency components can be captured in a case where the resolution is high. In order to perform peaking with high accuracy, it is necessary to set the band of the filter 220 to the highest band among the existing frequency components in both 2K and 4K. Therefore, it is necessary to adjust the band of the filter 220 and the peaking threshold set for each image resolution.

Since a higher frequency component can be captured when the resolution is higher, the band of the filter 220 for the 2K image is shifted to a frequency side lower than the band of the filter 220 for the 4K image. Moreover, since the energy is usually lower as the frequency component is higher in the image, for 2K and 4K, the peaking threshold for the 4K image is set to a value smaller than the peaking threshold for the 2K image. Thus, appropriate peaking according to the image resolution can be performed.

Note that, regarding the resolution, there is no need to calculate the peaking setting by interpolation calculation because the value does not change continuously unlike the zoom magnification and ISO sensitivity described above.

[1-3. Peaking Setting Adjustment According to Changes in a Plurality of Imaging Settings]

Next, processing for adjusting peaking settings according to combinations of changes in zoom magnification, ISO sensitivity, and image resolution as a plurality of imaging settings will be described. For the sake of convenience of description, it is assumed that the imaging apparatus 100 has the following specs.

Image resolution: 2K, 4K
ISO sensitivity: ISO100 to ISO64000
Optical zoom magnification: ×1 to ×4
Digital zoom magnification: ×1 to ×4
Peaking sensitivity: 3 levels (high, medium, low)

High, medium, and low peaking sensitivity are settings for the amount of peaking marker displayed on the display unit 160.

It is assumed that the image resolution, ISO sensitivity, and peaking sensitivity can be set by the user on a menu screen (user interface) and the like displayed on the display unit 160 of the imaging apparatus 100 as illustrated in FIG. 12. FIG. 12A is an example of a peaking sensitivity setting screen, FIG. 12B is an example of a setting screen for the band and peaking threshold of the filter 220, and FIG. 12C is an example of an ISO sensitivity setting screen.

Figure 12A:
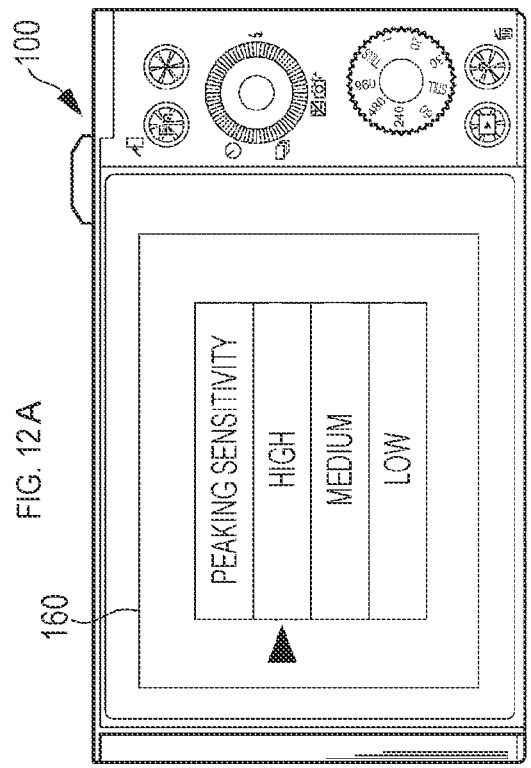
FIGS. 12A, 12B, 12C, and 12D are diagrams illustrating examples of user interfaces for inputting imaging settings.
Figure 12B:
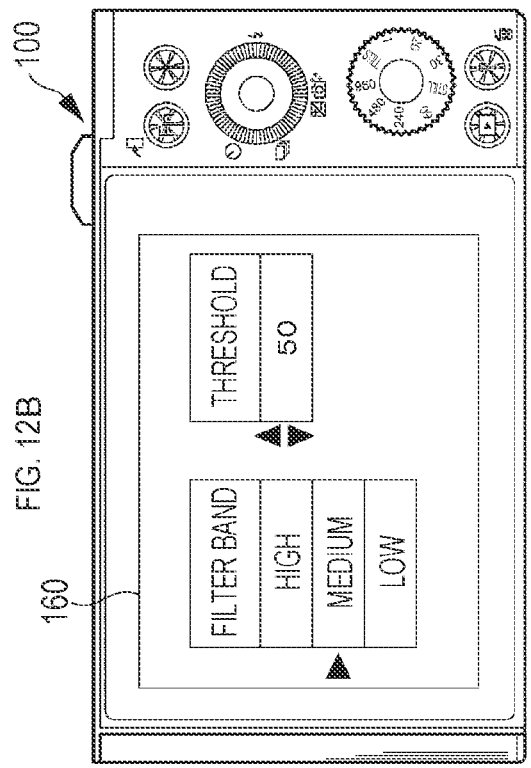
Figure 12C:
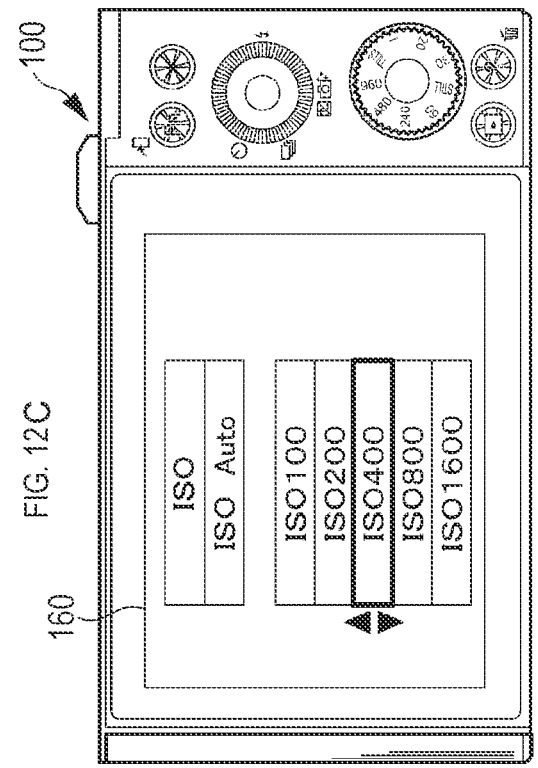
Figure 12D:
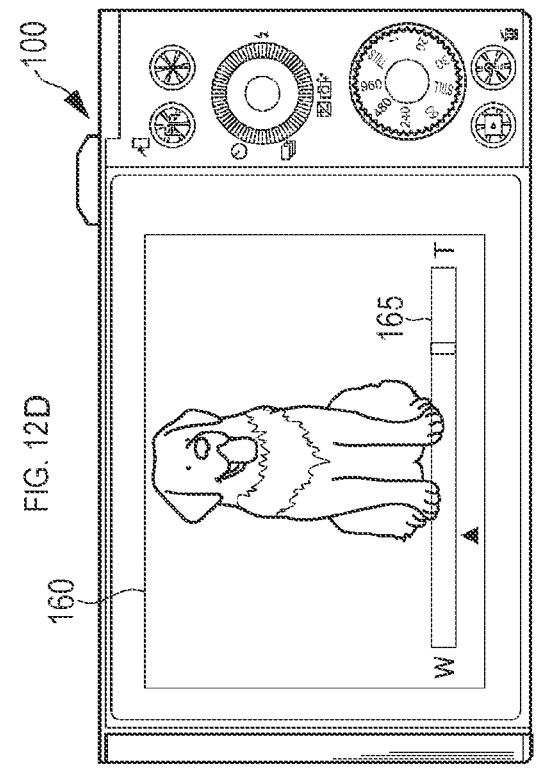

The zoom magnification can be changed continuously, for example, with a zoom lever as the input unit 170 provided in the imaging apparatus 100. Normally, in the case of zooming, optical zooming is performed, and in a case where further zooming is required, the zooming transitions to digital zoom with the optical zoom being maximized. Furthermore, a zoom user interface 165 as illustrated in FIG. 12D may be displayed on the display unit 160 in association with a change in zoom magnification according to the operation of the zoom lever.

In the following description, for the sake of convenience of description, it is assumed that imaging settings are associated with optical zoom ×1, ×2 and ×4, digital zoom ×1 and ×4, and ISO sensitivity ISO100, ISO800 and ISO64000.

First, one table is selected from the combinations of the peaking sensitivity and the image resolution illustrated in FIG. 13A. Note that, as illustrated in FIG. 13A, each table is associated with a combination of peaking sensitivity and resolution in the notation "table (x,y)". Then, as illustrated in FIG. 13B, each table stores peaking settings associated with combinations of optical zoom magnification, ISO sensitivity, and digital zoom. Note that each table in FIG. 13A stores peaking settings associated with combinations of digital zoom, optical zoom, and ISO sensitivity as illustrated in FIG. 13B. In FIG. 13B, each peaking setting is indicated in the form of fxy(i,j,k).

As illustrated in FIG. 13B, each table has a three-dimensional storage configuration in which peaking settings corresponding to the combination of optical zoom magnification and ISO sensitivity exist for each of digital zoom magnifications ×1 and ×4 (the overall configuration including x and y is five-dimensional).

For example, in a case where the digital zoom is ×1, the optical zoom is ×2, and the ISO sensitivity is ISO800, the peaking setting of fxy(0,1,1) is selected. Furthermore, for example, in a case where the digital zoom is ×2, the optical zoom is ×1.3, and the ISO sensitivity is ISO200, there is no peaking setting that matches the imaging setting. Therefore, an optimal peaking setting is calculated by linear interpolation from eight peaking settings covering the above setting values. In that case, the eight peaking settings are fxy(0,0,0), fxy(0,0,1), fxy(0,1,0), fxy(0,1,1), fxy(1,0,0), fxy(1,0,1), fxy(1,1,0), and fxy(1,1,1).

Figure 14:
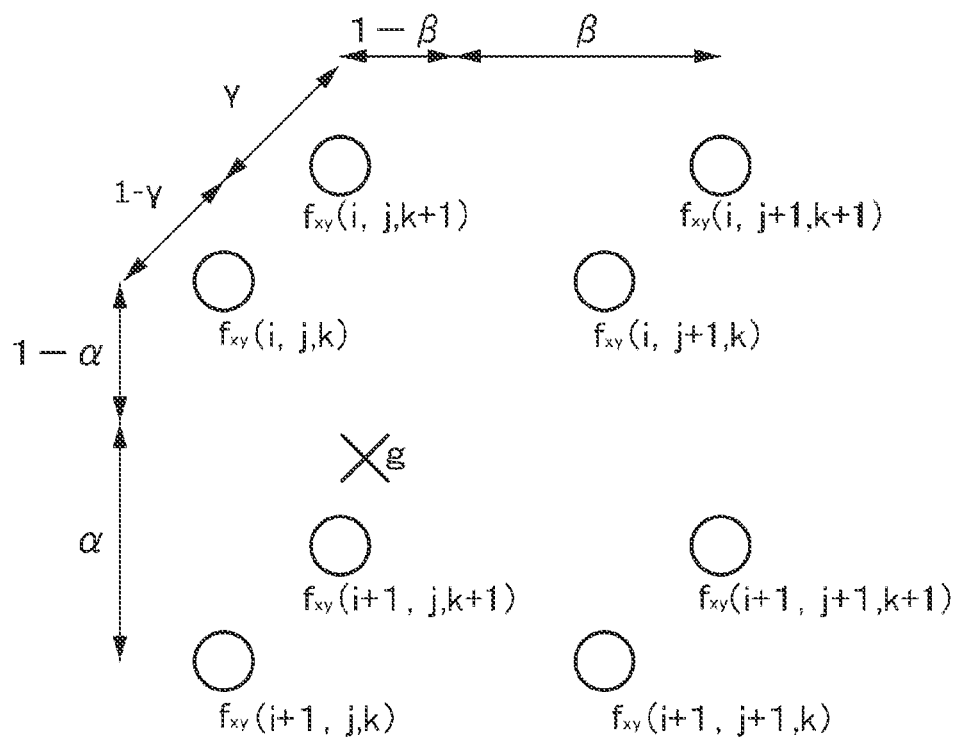
FIG. 14 is an explanatory diagram of linear interpolation.

When the calculated value by linear interpolation is g and fxy(i, j,k) is used, g is obtained by the following Formula (3) illustrated in FIG. 14.

[Formula 3]

$$g=\gamma\cdot(\alpha\cdot(\beta\cdot fxy(i,j,k)+(1-\beta)\cdot fxy(i,j+1,k))+(1-\alpha)\cdot(\beta\cdot(\beta\cdot fxy(i+1,j,k)+(1-\beta)\cdot fxy(i+1,j+1,k)))+(1-\gamma)\cdot(\alpha\cdot(\beta\cdot fxy(i,j,k+1)+(1-\beta)\cdot fxy(i,j+1,k+1))+(1-\alpha)\cdot(\beta\cdot fxy(i+1,j,k+1)+(1-\beta)\cdot fxy(i+1,j+1,k+1))) \quad (3)$$

By using the interpolation calculation as described above, the peaking setting can be changed smoothly and continuously not discretely according to the imaging setting, and optimal peaking corresponding to the change in the imaging setting can be performed. Furthermore, it is not necessary to prepare peaking settings with respect to combinations of all imaging settings in advance, and it is sufficient to prepare a finite number of peaking settings. Therefore, no matter how the imaging setting changes in any way, optimum peaking can be performed corresponding to all imaging settings with a finite number of parameters. Moreover, memory for storing peaking settings can be saved.

Note that the peaking setting may be calculated by spline interpolation using 18 peaking settings.

Figure 15:
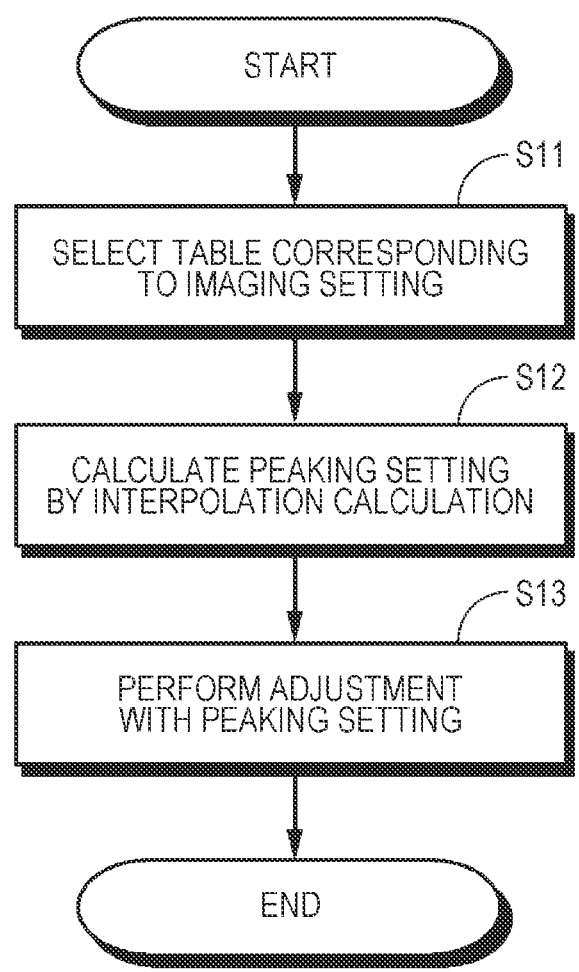
FIG. 15 is a flowchart illustrating a flow of peaking setting adjustment processing.

FIG. 15 is a flowchart illustrating a flow of processing for adjusting peaking settings in the peaking processing unit 200. First, in step S11, a table corresponding to the current imaging setting is selected. Next, in step S12, peaking setting is calculated from the table by interpolation calculation. Then, in step S13, the calculated peaking setting is applied to the peaking processing unit 200 to adjust the peaking setting.

In this way, the peaking setting is adjusted according to the imaging setting. According to the first embodiment, the peaking setting can be automatically adjusted to an optimum setting in response a change in the imaging setting. Since the peaking setting is adjusted to the optimum setting, the user can easily perform a focusing operation using peaking. Note that the change of the imaging setting described above is not limited to the case where the setting is changed by the user himself/herself, but includes the case where the imaging setting is automatically changed and the change of the imaging setting is automatically detected.

2. SECOND EMBODIMENT

[2-1. Configuration of the Peaking Processing Unit]

Figure 16:
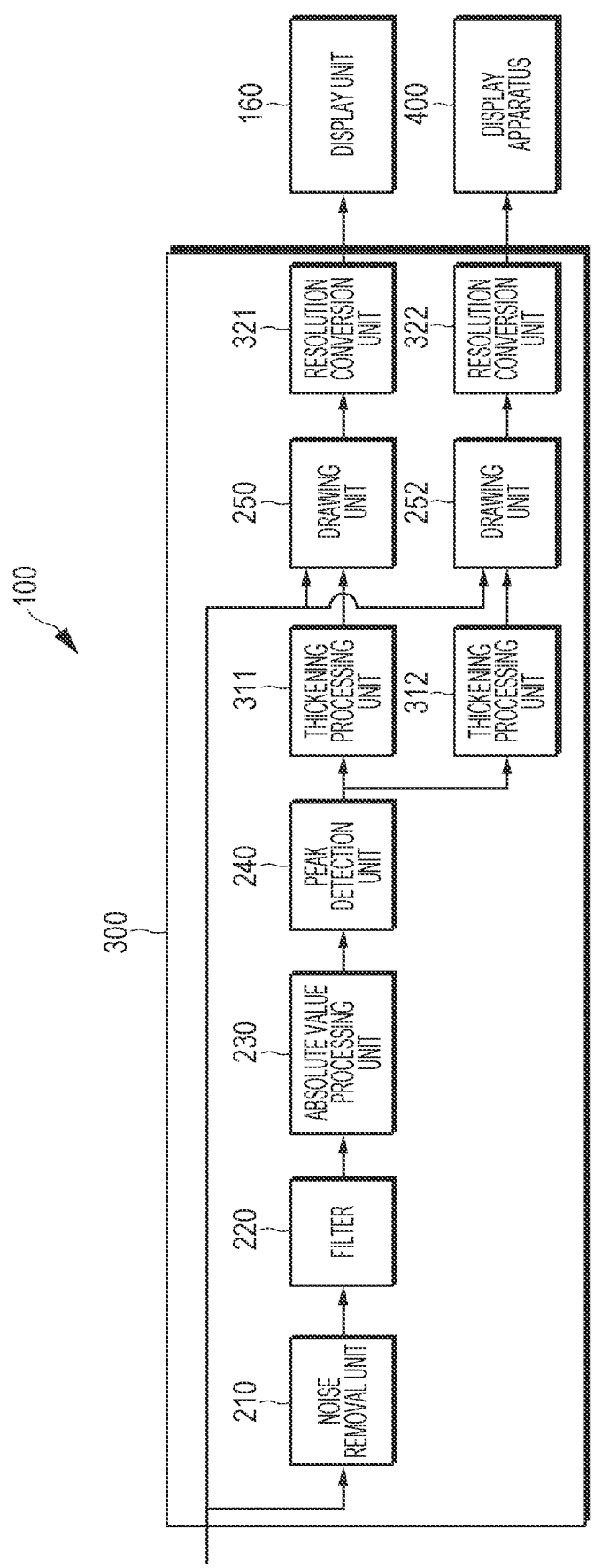
FIG. 16 is a block diagram illustrating a configuration of a peaking processing unit according to a second embodiment.

Next, the configuration of a peaking processing unit 300 according to the second embodiment will be described with reference to FIG. 16. The second embodiment differs from the first embodiment in that the peaking processing unit 300 includes a thickening processing unit 311, a thickening processing unit 312, a resolution conversion unit 321, a resolution conversion unit 322, and a drawing unit 252, and is connected to a display apparatus 400, which is an external display device. Since the other configurations of the peaking processing unit 300 and the imaging apparatus 100 are similar to those in the first embodiment, description thereof is omitted.

The thickening processing unit 311 performs processing to increase the line width of the marker drawn on the pixel constituting the image by the drawing unit 250 on the basis of the ratio between the resolution of the image and the resolution of the display unit 160 that displays the image.

In the thickening processing, the pixel number F of the marker after thickening is obtained by the following Formula (4) where Rm is the resolution of the image and Ro is the resolution of the display apparatus 400.

[Formula 4]

$$F=\text{int}(Rm/Ro+0.5) \quad (4)$$

For example, in a case where the image resolution is 4K, the number of pixels in the width direction is 3840, and the display apparatus 400 is an LCD panel in which the number of pixels in the width direction is 800, F is as described below.

$$F=\text{int}(3840/800+0.5)=5$$

Figure 17:
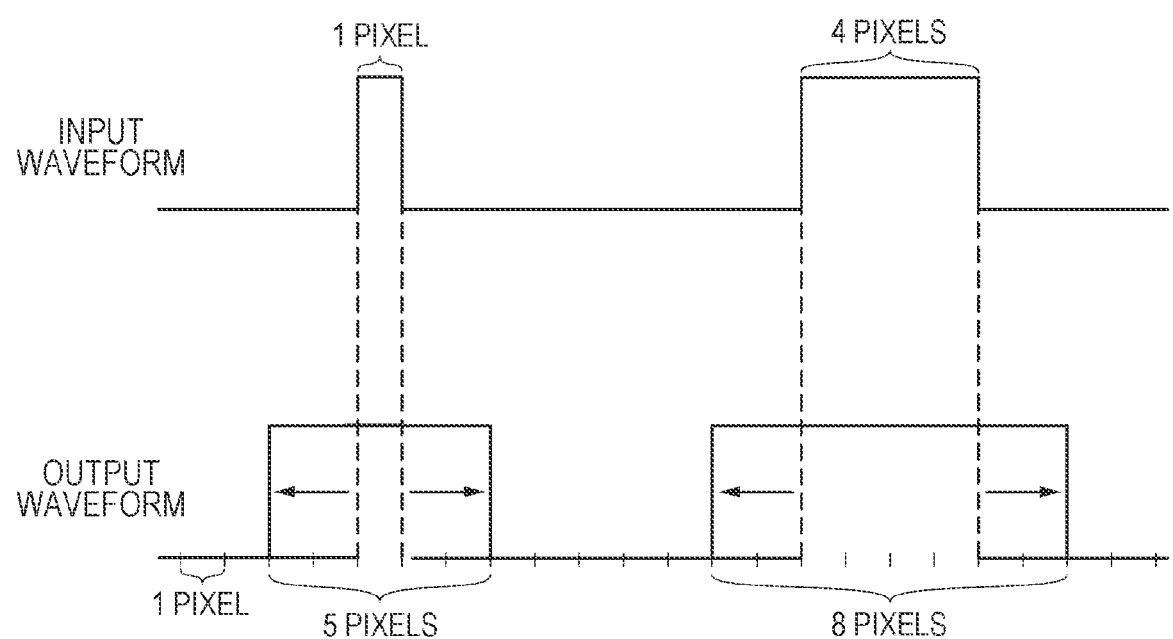
FIG. 17 is an explanatory diagram of thickening processing.

Then, the peak signal detected by the peak detection unit 240 is thickened for four pixels as illustrated in FIG. 17, and is supplied to the drawing unit 250 as a marker. In the example of FIG. 17, the input waveform having a width of 1 pixel is thickened for four pixels, and the width of the output waveform is five pixels. Furthermore, in a case where the input waveform width is four pixels, each pixel is thickened to five pixels and the pixels overlap each other, so that the output waveform width is eight pixels in total after thickening of four pixels.

Note that in order to increase the degree of thickening to have increased marker visibility, the thickening processing may be performed by calculating the magnification F using the following Formula (5) including coefficient K.

[Formula 5]

$$F=\text{int}\{(Rm/Ro)\cdot K+0.5\} \quad (5)$$

The resolution conversion unit 321 performs processing for converting the resolution of the image into the resolution of the display unit 160 using a low-pass filter so that the image can be displayed on the display apparatus 400 having a resolution lower than the resolution of the image. The image is converted into the resolution of the display unit 160 by the resolution conversion unit 321, supplied to the display unit 160, and displayed on the display unit 160.

The thickening processing unit 312, the drawing unit 252, and the resolution conversion unit 322 are similar to the thickening processing unit 311, the drawing unit 250, and the resolution conversion unit 321, respectively. The thickening processing unit 312, the drawing unit 252, and the resolution conversion unit 322 perform processing on an image to be displayed on the display apparatus 400.

The second embodiment is useful when an image captured by the imaging apparatus 100 is displayed on a plurality of display devices having different resolutions. Therefore, as illustrated in FIG. 16, the imaging apparatus 100 may include the same number of thickening processing units, drawing units, and resolution conversion units as the number of display devices. In FIG. 16, since there are the display unit 160 and the display apparatus 400, two thickening processing units, two drawing units, and two resolution conversion units are configured to be provided. In a case where there are three display devices provided at/connected to the imaging apparatus 100, three thickening processing units, three drawing units, and three resolution conversion units are provided.

The mode for displaying an image on a plurality of display devices is, for example, a case where the same image is displayed on an external display connected to an output terminal of the imaging apparatus 100 while the image is displayed on the display unit 160 of the imaging apparatus 100.

Note that similar to the first embodiment, the peaking setting is adjusted according to the change in the imaging setting.

According to the second embodiment, since the peaking marker is thickened by the thickening processing unit, even if the resolution of the image is reduced due to resolution conversion, the marker is broken to make the peaking difficult to see.

Furthermore, since the thickness of the peaking marker is adjusted according to the resolution of each of the plurality of display devices, the visibility of peaking is increased, and the user can easily perform a focusing operation using peaking.

3. VARIATION

Heretofore, the embodiments of the present technology have been described in detail, but the present technology is not limited to the aforementioned embodiments, but various modifications based on the technical idea of the present technology may be made.

Peaking may be performed by increasing the number of lines along the edge portion of the subject or by thickening the lines along the contour of the subject by means of marker drawing as well as by changing the brightness and color of the pixel or by superimposing a signal for emphasizing on the pixels. The brightness and color of the pixels other than the pixels to be emphasized may be relatively reduced so that the pixels other than the pixels to be emphasized are displayed in a blurred manner. As long as the pixels to be emphasized can be distinguished from the other pixels, the mode of display is not limited to a specific method.

In the above-described embodiments, it has been described that the optical zoom is first performed in the zoom, and the transition to the digital zoom is performed in a case where further zoom is necessary in a state where the optical zoom is maximized. However, in a case where the imaging apparatus 100 has an enlargement display function as illustrated in FIG. 18, the digital zoom is performed without changing the magnification of the optical zoom.

This enlargement display function is performed in response to a button input that gives an instruction of execution of enlarge display. As illustrated in FIG. 18A, when a user gives inputs on an enlargement display button after capturing a desired subject within the angle of view, a frame 500 illustrating an enlargement display range on the monitoring image is displayed in a superimposed manner on the display unit 160 as illustrated in FIG. 18B. This frame 500 can be moved to a desired position within the angle of view. Then, when an input is performed again on the enlargement display button in a state where the frame 500 is displayed in a superimposed manner, the region in the frame 500 is enlarged and displayed on the display unit 160 as illustrated in FIG. 18C.

The enlargement by the enlargement display function is performed by increasing the digital zoom magnification while maintaining the optical zoom magnification without change. Therefore, the band of the filter 220 is adjusted according to the change in the magnification of the digital zoom.

The present technology can be applied to both still images and movies. Furthermore, the present technology is not limited to a digital camera, but can be applied to any equipment such as a smartphone, a tablet terminal, a personal computer, a portable game machine, a wearable terminal, and the like as long as the equipment has an imaging function and a peaking function.

4. APPLICATION EXAMPLE

The technology according to the present disclosure is applicable to a variety of products. For example, the technology according to the present disclosure may be applied to a surgery room system.

Figure 19:
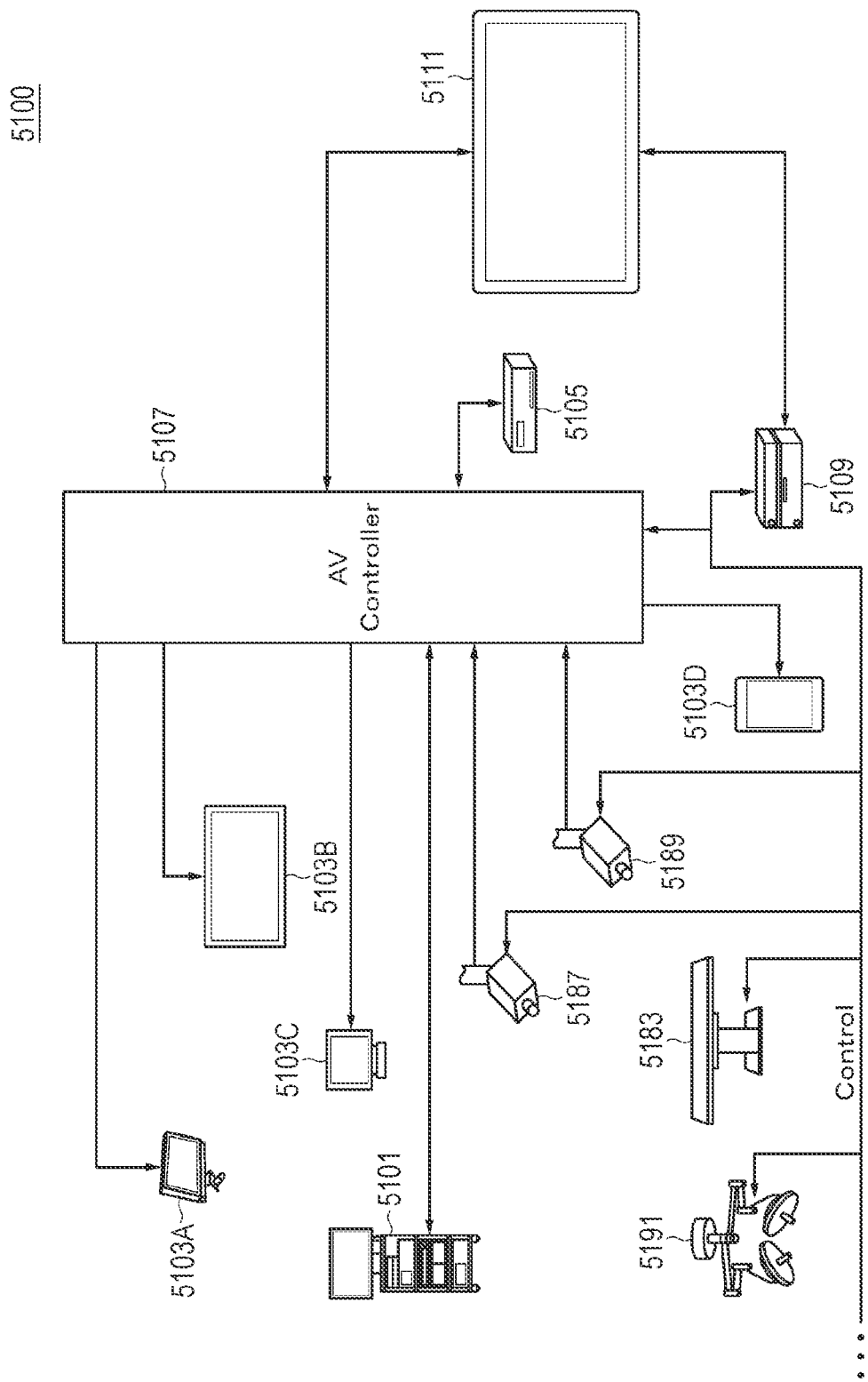
FIG. 19 is a diagram schematically illustrating the overall configuration of a surgery room system.

FIG. 19 is a diagram schematically illustrating the overall configuration of a surgery room system 5100 to which the technology according to the present disclosure can be applied. With reference to FIG. 19, the surgery room system 5100 is configured such that a device group installed in a surgery room is connected to be capable of cooperating with each other through an audiovisual controller (AV controller) 5107 and a surgery room control device 5109.

In the surgery room, various devices can be provided. In FIG. 19, as an example, various device groups 5101 for an endoscopic surgery, a ceiling camera 5187 which is disposed on the ceiling of the surgery room, and images the hands of a surgery operator, a surgery site camera 5189 which is disposed on the ceiling of the surgery room, and images the entire state of the surgery room, a plurality of display devices 5103A to 5103D, a recorder 5105, a patient bed 5183, and an illumination 5191, are illustrated.

Here, in such devices, the device group 5101 belongs to an endoscope surgery system 5113 as described later, and includes an endoscope, a display device displaying an image imaged by the endoscope, and the like. Each of the devices belonging to the endoscope surgery system 5113 is also referred to as medical equipment. On the other hand, the display devices 5103A to 5103D, the recorder 5105, the patient bed 5183, and the illumination 5191, for example, are a device provided in the surgery room, separately from the endoscope surgery system 5113. Each of the devices not belonging to the endoscope surgery system 5113, is also referred to as non-medical equipment. The audiovisual controller 5107 and/or the surgery room control device 5109, cooperatively control the operation of the medical equipment and the non-medical equipment.

The audiovisual controller 5107 integrally controls processing relevant to image display in the medical equipment and the non-medical equipment. Specifically, in the devices of the surgery room system 5100, the device group 5101, the ceiling camera 5187, and the surgery site camera 5189 can be a device having a function of transmitting information to be displayed during the surgery (hereinafter, also referred to as display information) (hereinafter, also referred to as a device of a transmission source). Furthermore, the display devices 5103A to 5103D can be a device to which the display information is output (hereinafter, also referred to as a device of an output destination). Furthermore, the recorder 5105 can be a device corresponding to both of the device of the transmission source and the device of the output destination. The audiovisual controller 5107 has a function of controlling the operation of the device of the transmission source and the device of the output destination, of acquiring the display information from the device of the transmission source, of transmitting the display information to the device of the output destination, and of displaying or recording the display information. Note that the display information is various images imaged during the surgery, various information items associated to the surgery (for example, body information of a patient, a test result of the past, information associated with a surgery method, or the like), and the like.

Specifically, information with respect to an image of a surgery portion in body cavity of the patient, which is imaged by the endoscope, can be transmitted to the audiovisual controller 5107 from the device group 5101, as the display information. Furthermore, information with respect to an image of the hands of the surgery operator, which is imaged by the ceiling camera 5187, can be transmitted from the ceiling camera 5187, as the display information. Furthermore, information with respect to an image indicating the entire state of the surgery room, which is imaged by the surgery site camera 5189, can be transmitted from the surgery site camera 5189, as the display information. Note that in a case where the other device having an imaging function exists in the surgery room system 5100, the audiovisual controller 5107 may acquire information with respect to an image imaged by the other device from the other device, as the display information.

Alternatively, for example, in the recorder 5105, the information with respect to the image imaged in the past is recorded by the audiovisual controller 5107. The audiovisual controller 5107 is capable of acquiring the information with respect to the image imaged in the past, from the recorder 5105, as the display information. Note that, in the recorder 5105, various information items associated to the surgery may be also recorded in advance.

The audiovisual controller 5107 displays the acquired display information (i.e., an image captured during the surgery or various information items associated to the surgery) on at least one of the display devices 5103A to 5103D, which are the device of the output destination. In the illustrated example, the display device 5103A is a display device disposed to be suspended from the ceiling of the surgery room, the display device 5103B is a display device disposed on a wall surface of the surgery room, the display device 5103C is a display device disposed on a desk in the surgery room, and the display device 5103D is mobile equipment having a display function (for example, a tablet personal computer (PC)).

Furthermore, even though it is not illustrated in FIG. 19, the surgery room system 5100 may include a device outside the surgery room. The device outside the surgery room, for example, can be a server connected to a network constructed inside or outside the hospital, or a PC used by a medical staff, a projector disposed in an assembly room of the hospital, and the like. In a case where such an external device is outside the hospital, the audiovisual controller 5107 is capable of displaying the display information on a display device of the other hospital through a teleconference system or the like, in order for a remote medical care.

The surgery room control device 5109 integrally controls processing other than the processing relevant to the image display in the non-medical equipment. For example, the surgery room control device 5109 controls the driving of the patient bed 5183, the ceiling camera 5187, the surgery site camera 5189, and the illumination 5191.

In the surgery room system 5100, a centralized manipulation panel 5111 is provided, a user is capable of giving an instruction with respect to the image display, to the audiovisual controller 5107, or of giving an instruction with respect to the operation of the non-medical equipment, to the surgery room control device 5109, through the centralized manipulation panel 5111.

The centralized manipulation panel 5111 has a configuration in which a touch panel is disposed on a display surface of the display device.

Figure 20:
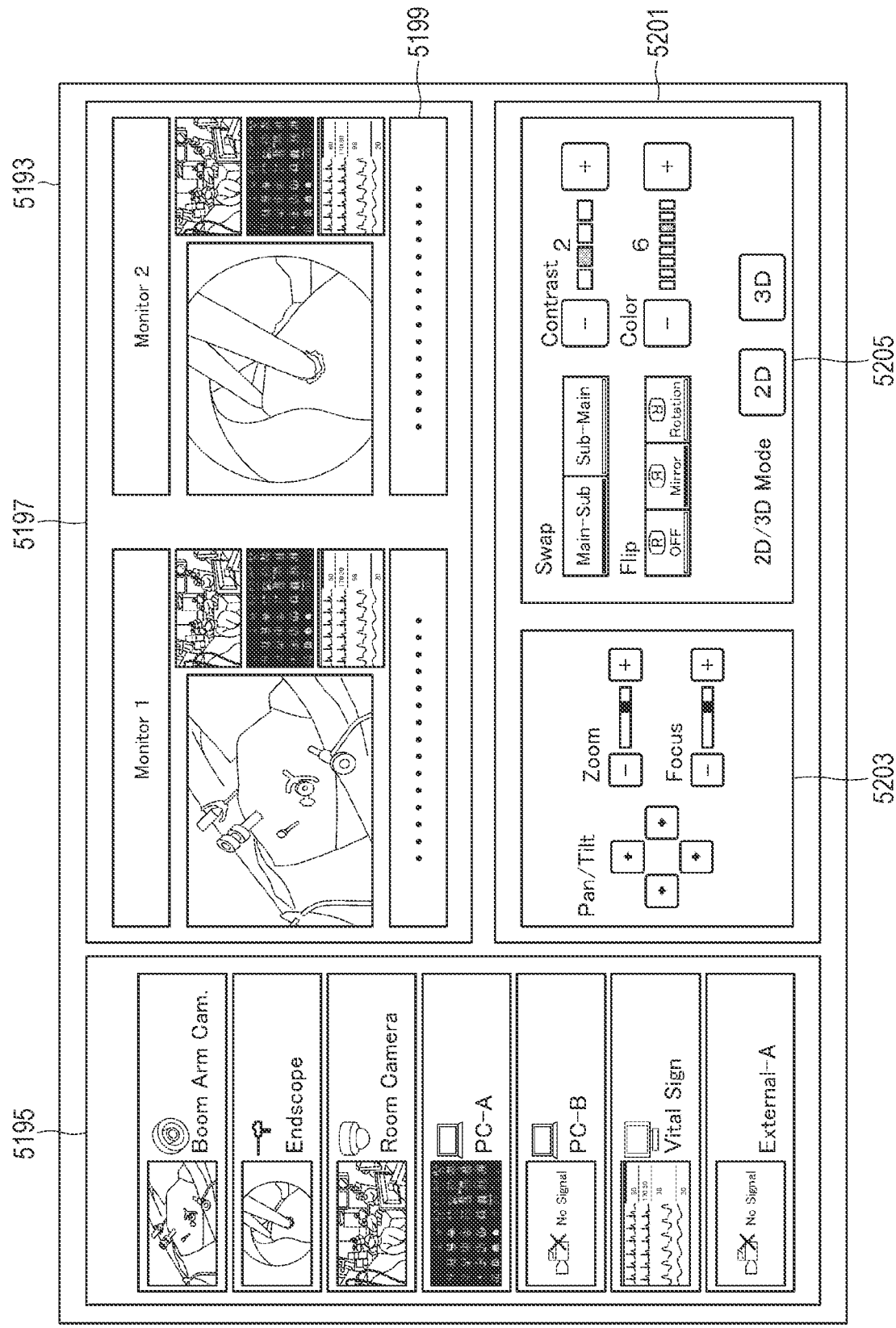
FIG. 20 is a diagram illustrating a display example of a manipulation screen on a centralized manipulation panel.

FIG. 20 is a diagram illustrating a display example of a manipulation screen of the centralized manipulation panel 5111. In FIG. 20, as an example, a manipulation screen corresponding to a case where two display devices are provided in the surgery room system 5100, as the device of the output destination, is illustrated. With reference to FIG. 20, in the manipulation screen 5193, a transmission source selection region 5195, a preview region 5197, and a control region 5201 are provided.

On the transmission source selection region 5195, a transmission source device provided in the surgery room system 5100, and a thumbnail screen indicating display information of the transmission source device, are displayed to be linked to each other. The user is capable of selecting the display information to be displayed on the display device, from any transmission source device displayed on the transmission source selection region 5195.

On the preview region 5197, a preview of a screen to be displayed on two display devices (Monitor 1 and Monitor 2), which are the device of the output destination, is displayed. In the illustrated example, four images are PinP-displayed on one display device. The four images correspond to the display information transmitted from the transmission source device selected in the transmission source selection region 5195. In four images, one image is displayed comparatively large as a main image, and the remaining three images are displayed comparatively small as a sub-image. The user suitably selects a region on which four images are displayed, and thus, is capable of switching the main image and the sub-image. Furthermore, in a lower portion of the region on which four images are displayed, a status display region 5199 is provided, and a status relevant to the surgery (for example, an elapsed time of the surgery, the body information of the patient, and the like) can be suitably displayed on the region.

In the control region 5201, a transmission source manipulation region 5203 on which a graphical user interface (GUI)

component for performing a manipulation with respect to the device of the transmission source, is displayed, and an output destination manipulation region 5205 on which a GUI component for performing a manipulation with respect to the device of the output destination, is displayed, are provided. In the illustrated example, in the transmission source manipulation region 5203, a GUI component for performing various manipulations (pan, tilt, and zoom) with respect to a camera in the device of the transmission source, having an imaging function, is provided. The user suitably selects the GUI component, and thus, is capable of manipulating the operation of the camera in the device of the transmission source. Note that, even though it is not illustrated, in a case where the device of the transmission source, selected in the transmission source selection region 5195, is a recorder (i.e., in a case where the image recorded in the recorder in the past, is displayed on the preview region 5197), in the transmission source manipulation region 5203, a GUI component for performing a manipulation such as reproducing, stopping reproducing, rewinding, and fast forwarding of the image, can be provided.

Furthermore, in the output destination manipulation region 5205, a GUI component for performing various manipulations (swap, flip, tone adjustment, contrast adjustment, and switching between 2D display and 3D display) with respect to the display on the display device which is the device of the output destination, is provided. The user suitably selects such a GUI component, and thus, is capable of manipulating the display on the display device.

Note that the manipulation screen to be displayed on the centralized manipulation panel 5111 is not limited to the illustrated example, and the user may perform manipulation input with respect to each device, which is provided in the surgery room system 5100, and is capable of being controlled by the audiovisual controller 5107 and the surgery room control device 5109, through the centralized manipulation panel 5111.

Figure 21:
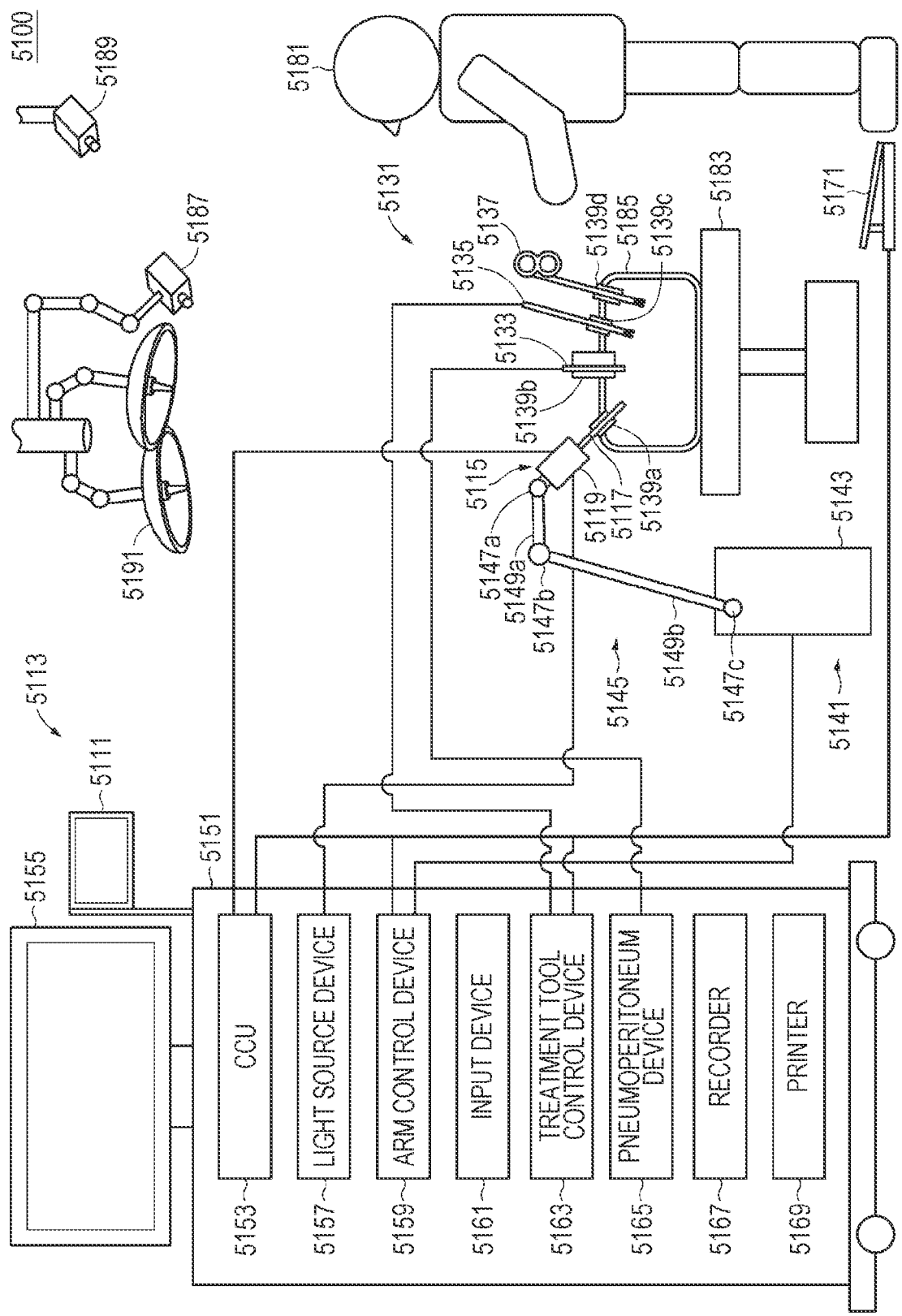
FIG. 21 is a diagram illustrating an example of a state of a surgery to which the surgery room system is applied.

FIG. 21 is a diagram illustrating an example of the state of the surgery to which the surgery room system described above is applied. The ceiling camera 5187 and the surgery site camera 5189 are disposed on the ceiling of the surgery room, and are capable of capturing the hands of a surgery operator (a medical doctor) 5181 performing a treatment with respect to an affected part of a patient 5185 on the patient bed 5183, and the entire state of the surgery room. In the ceiling camera 5187 and the surgery site camera 5189, a magnification adjustment function, a focal point distance adjustment function, a capturing direction adjustment function, and the like can be provided. The illumination 5191 is disposed on the ceiling of the surgery room, and irradiates at least the hands of the surgery operator 5181 with light. The illumination 5191 may suitably adjust an irradiation light amount, a wavelength (a color) of irradiation light, a light irradiation direction, and the like.

As illustrated in FIG. 19, the endoscope surgery system 5113, the patient bed 5183, the ceiling camera 5187, the surgery site camera 5189, and the illumination 5191 are connected to be capable of cooperating with each other, through the audiovisual controller 5107 and the surgery room control device 5109 (not illustrated in FIG. 21). In the surgery room, the centralized manipulation panel 5111 is provided, and as described above, the user is capable of suitably manipulating the devices existing in the surgery room, through the centralized manipulation panel 5111.

Hereinafter, the configuration of the endoscope surgery system 5113 will be described in detail. As illustrated, the endoscope surgery system 5113 includes an endoscope 5115, other surgical tools 5131, a support arm device 5141 supporting the endoscope 5115, and a cart 5151 on which various devices for an endoscopic surgery are mounted.

In the endoscope surgery, a plurality of tubular perforating tools referred to as trocars 5139a to 5139d, is punctured on an abdominal wall, instead of performing laparotomy by cutting the abdominal wall. Then, a lens tube 5117 of the endoscope 5115, and the other surgical tools 5131 are inserted into the body cavity of the patient 5185, from the trocars 5139a to 5139d. In the illustrated example, as the other surgical tools 5131, a pneumoperitoneum tube 5133, an energy treatment tool 5135, and forceps 5137 are inserted into the body cavity of the patient 5185. Furthermore, the energy treatment tool 5135 is a treatment tool performing incision and ablation of a tissue, sealing of a blood vessel, and the like, according to a high frequency current or an ultrasonic vibration. Here, the illustrated surgical tool 5131 is merely an example, and for example, various surgical tools generally used in the endoscopic surgery, such as tweezers and a retractor, may be used as the surgical tool 5131.

The image of the surgery portion in the body cavity of the patient 5185, captured by the endoscope 5115, is displayed on the display device 5155. The surgery operator 5181, for example, performs a treatment such as excision of the affected part by using the energy treatment tool 5135 or the forceps 5137, while observing the image of the surgery portion displayed on the display device 5155, in real time. Note that, even though it is not illustrated, the pneumoperitoneum tube 5133, the energy treatment tool 5135, and the forceps 5137 are supported by the surgery operator 5181, an assistant, or the like, during the surgery.

(Support Arm Device)

The support arm device 5141 includes an arm portion 5145 extending from a base portion 5143. In the illustrated example, the arm portion 5145 includes joint portions 5147a, 5147b, and 5147c, and links 5149a and 5149b, and is driven according to the control from the arm control device 5159. The endoscope 5115 is supported by the arm portion 5145, and the position and the posture thereof are controlled. With this arrangement, a stable position of the endoscope 5115 can be fixed.

(Endoscope)

The endoscope 5115 includes a lens tube 5117 in which a region of a predetermined length from a tip end, is inserted into the body cavity of the patient 5185, and a camera head 5119 connected to a base end of the lens tube 5117. In the illustrated example, the endoscope 5115 configured as a so-called rigid scope including a rigid lens tube 5117, is illustrated, but the endoscope 5115 may be configured as a so-called flexible scope including a flexible lens tube 5117.

An opening portion into which an objective lens is fitted, is provided on the tip end of the lens tube 5117. A light source device 5157 is connected to the endoscope 5115, and light generated by the light source device 5157 is guided to the tip end of the lens tube by a light guide provided to extend in the lens tube 5117, and is applied towards an observation target in the body cavity of the patient 5185 through the objective lens. Note that the endoscope 5115 may be a forward-viewing endoscope, or may be an oblique-viewing endoscope or a side-viewing endoscope.

In the camera head 5119, an optical system and an image sensor 130 are provided, and reflection light (observation light) from the observation target, is condensed in the image sensor 130 by the optical system. The observation light is subjected to the photoelectric conversion by the image sensor 130, and an electrical signal corresponding to the observation light, that is, an image signal corresponding to an observation image, is generated. The image signal is transmitted to a camera control unit (CCU) 5153, as RAW data. Note that in the camera head 5119, a function of adjusting a magnification and a focal point distance by suitably driving the optical system, is provided.

Note that, for example, a plurality of image sensors 130 may be provided in the camera head 5119, in order to correspond to a stereoscopic view (3D display) or the like. In this case, a plurality of relay optical systems is provided in the lens tube 5117, in order to guide the observation light to each of the plurality of image sensors 130.

(Various Devices Mounted on Cart)

The CCU 5153 includes a central processing unit (CPU), a graphics processing unit (GPU), or the like, and integrally controls the operation of the endoscope 5115 and the display device 5155. Specifically, the CCU 5153 performs, for example, various image processing for displaying the image based on the image signal, such as development processing (demosaic processing), on the image signal received from the camera head 5119. The CCU 5153 provides the image signal subjected to the image processing, to the display device 5155. Furthermore, the audiovisual controller 5107 illustrated in FIG. 19, is connected to the CCU 5153. The CCU 5153 also provides the image signal subjected to the image processing, to the audiovisual controller 5107. Furthermore, the CCU 5153 transmits a control signal to the camera head 5119, and controls the driving thereof. The control signal is capable of including information associated with an imaging condition such as a magnification or a focal point distance. The information associated with the imaging condition, may be input through an input device 5161, or may be input through the centralized manipulation panel 5111 described above.

The display device 5155 displays an image based on the image signal subjected to the image processing by the CCU 5153, according to the control from the CCU 5153. In a case where the endoscope 5115, for example, corresponds to high-definition capturing such as 4K (the number of horizontal pixels of 3840×the number of vertical pixels of 2160) or 8K (the number of horizontal pixels of 7680×the number of vertical pixels of 4320), and/or corresponds to 3D display, a display device capable of performing high-definition display corresponding to each of 4K and 8K, and/or a display device capable of performing 3D display, can be used as the display device 5155. In the case of corresponding to the high-definition capturing such as 4K or 8K, a display device having a size of greater than or equal to 55 inches is used as the display device 5155, and thus, more immersion feeling can be obtained. Furthermore, a plurality of display devices 5155 having different definitions and sizes may be provided, according to a use application.

The light source device 5157, for example, includes a light source such as a light emitting diode (LED), and supplies the irradiation light at the time of capturing the surgery portion, to the endoscope 5115.

The arm control device 5159, for example, includes a processor such as a CPU, and is operated according to a predetermined program, and thus, controls the driving of the arm portion 5145 of the support arm device 5141, according to a predetermined control method.

The input device 5161 is an input interface with respect to the endoscope surgery system 5113. The user is capable of performing the input of various information items, or the input of an instruction with respect to endoscope surgery system 5113, through the input device 5161. For example, the user inputs various information items associated with the surgery, such as the body information of the patient, and the information associated to the surgery method of the surgery, through the input device 5161. Furthermore, for example, the user inputs an instruction of driving the arm portion 5145, an instruction of changing the imaging condition of the endoscope 5115 (the type of irradiation light, the magnification, the focal point distance, and the like), an instruction of driving the energy treatment tool 5135, and the like, through the input device 5161.

The type of input device 5161 is not limited, and the input device 5161 may be various known input devices. For example, a mouse, a keyboard, a touch panel, a switch, a foot switch 5171 and/or a lever, and the like can be applied as the input device 5161. In a case where the touch panel is used as the input device 5161, the touch panel may be disposed on the display surface of the display device 5155.

Alternatively, the input device 5161, for example, is a device mounted on the user, such as a glasses type wearable device or a head mounted display (HMD), various inputs are performed according to the gesture or a line-of-sight of the user, which is detected by such a device. Furthermore, the input device 5161 includes a camera capable of detecting the motion of the user, and various inputs are performed according to the gesture or the line-of-sight of the user detected from a video imaged by the camera. Moreover, the input device 5161 includes a microphone capable of picking up the voice of the user, and various inputs are performed according to the sound through the microphone. Thus, the input device 5161 is configured such that various information items can be input in a non-contact manner, and thus, in particular, a user belonging to a clean area (for example, the surgery operator 5181) is capable of manipulating the equipment belonging to an unclean area, in a non-contact manner. Furthermore, the user is capable of manipulating the equipment without releasing the hands from the possessed surgical tool, and thus, convenience of the user is improved.

The treatment tool control device 5163 controls the driving of the energy treatment tool 5135 for the cauterization and the incision of the tissue, the sealing of the blood vessel, or the like. In order to ensure a visual field of the endoscope 5115 and to ensure a working space of the surgery operator, the pneumoperitoneum device 5165 sends gas into the body cavity through the pneumoperitoneum tube 5133 such that the body cavity of the patient 5185 is inflated. The recorder 5167 is a device capable of recording various information items associated with the surgery. The printer 5169 is a device capable of printing various information items associated with the surgery, in various formats such as a text, an image, or a graph.

Hereinafter, in the endoscope surgery system 5113, a particularly characteristic configuration will be described in more detail.

(Support Arm Device)

The support arm device 5141 includes the base portion 5143 which is a base, and the arm portion 5145 extending from the base portion 5143. In the illustrated example, the arm portion 5145 includes the plurality of joint portions 5147*a*, 5147*b*, and 5147*c*, and the plurality of links 5149*a* and 5149*b* joined by the joint portion 5147*b*, but in FIG. 21, for the sake of simplicity, the configuration of the arm portion 5145 is simply illustrated. Actually, the shape of the joint portions 5147*a* to 5147*c* and the links 5149*a* and 5149*b*, the number of joint portions 5147*a* to 5147*c* and links 5149*a* and 5149*b*, the arrangement of the joint portions 5147*a* to 5147*c* and the links 5149*a* and 5149*b*, a rotation axis direction of the joint portions 5147*a* to 5147*c*, and the like are suitably set such that the arm portion 5145 has a desired freedom degree. For example, the arm portion 5145 can be preferably configured to have a freedom degree of greater than or equal to six. With this arrangement, the endoscope 5115 can be freely moved within a movement range of the arm portion 5145, and thus, it is possible to insert the lens tube 5117 of the endoscope 5115 into the body cavity of the patient 5185 from a desired direction.

In the joint portions 5147a to 5147c, an actuator is provided, and the joint portions 5147a to 5147c can be rotated around a predetermined rotation axis by driving the actuator. The driving of the actuator is controlled by the arm control device 5159, and thus, a rotation angle of each of the joint portions 5147a to 5147c is controlled, and the driving of the arm portion 5145 is controlled. With this arrangement, the position and the posture of the endoscope 5115 can be controlled. At this time, the arm control device 5159 is capable of controlling the driving of the arm portion 5145, according to various known control methods such as force control or position control.

For example, the surgery operator 5181 performs suitable manipulation input through the input device 5161 (including the foot switch 5171), and thus, the driving of the arm portion 5145 may be suitably controlled by the arm control device 5159, according to the manipulation input, and the position and the posture of the endoscope 5115 may be controlled. According to the control, the endoscope 5115 on the tip end of the arm portion 5145, can be moved to an arbitrary position from an arbitrary position, and then, can be fixedly supported in the position after the movement. Note that the arm portion 5145 may be manipulated by a so-called master-slave system. In this case, the arm portion 5145 can be remotely manipulated by the user, through the input device 5161 provided in a location separated from the surgery room.

Furthermore, in a case where the force control is applied, so-called power assist control may be performed, in which the arm control device 5159 receives an external force from the user, and drives the actuator of each of the joint portions 5147a to 5147c such that the arm portion 5145 is smoothly moved according to the external force. With this arrangement, when the user moves the arm portion 5145 while directly touching the arm portion 5145, it is possible to move the arm portion 5145 with a comparatively light force. Accordingly, it is possible to more intuitively move the endoscope 5115 by a simpler manipulation, and to improve the convenience of the user.

Here, in general, in the endoscopic surgery, the endoscope 5115 is supported by a medical doctor referred to as a scopist. In contrast, the position of the endoscope 5115 can be more reliably fixed by using the support arm device 5141, without manual work, and thus, it is possible to stably obtain the image of the surgery portion, and to smoothly perform the surgery.

Note that the arm control device 5159 may not be necessarily provided in the cart 5151. Furthermore, the arm control device 5159 may not be necessarily one device. For example, the arm control device 5159 may be provided in each of the joint portions 5147a to 5147c of the arm portion 5145 of the support arm device 5141, and a plurality of arm control devices 5159 may cooperate with each other, and thus, the driving control of the arm portion 5145 may be realized.

(Light Source Device)

The light source device 5157 supplies the irradiation light at the time of capturing the surgery portion, to the endoscope 5115. The light source device 5157, for example, includes a white light source including an LED, a laser light source, or a combination thereof. At this time, in a case where the white light source includes a combination of RGB laser light sources, it is possible to control an output intensity and an output timing of each color (each wavelength) with a high accuracy, and thus, it is possible to adjust a white balance of the image in the light source device 5157. Furthermore, in this case, laser light from each of the RGB laser light sources is applied to the observation target in a time division manner, and the driving of the image sensor of the camera head 5119 is controlled in synchronization with the irradiation timing, and thus, it is also possible to image an image corresponding to each of RGB in a time division manner. According to such a method, it is possible to obtain a color image without providing a color filter in the image sensor.

Furthermore, the driving of the light source device 5157 may be controlled such that the intensity of the light to be output is changed for each predetermined time. The driving of the image sensor of the camera head 5119 is controlled in synchronization with a timing when the intensity of the light is changed, images are acquired in a time division manner, and the images are synthesized, and thus, it is possible to generate an image of a high dynamic range, without so-called black defects and overexposure.

Furthermore, the light source device 5157 may be configured to supply light of a predetermined wavelength band corresponding to special light imaging. In the special light imaging, for example, light of a narrow band is applied, compared to irradiation light at the time of performing usual observation by using wavelength dependency of absorbing light in the body tissue (i.e., white light), and thus, so-called narrow band imaging of capturing a predetermined tissue of a blood vessel or the like in a superficial portion of a mucous membrane with a high contrast, is performed. Alternatively, in the special light imaging, fluorescent light imaging of obtaining an image by fluorescent light generated by being irradiated with excited light, may be performed. In the fluorescent light imaging, for example, the body tissue is irradiated with the excited light, and the fluorescent light from the body tissue is observed (autofluorescent light imaging), or a reagent such as indocyanine green (ICG) is locally injected into the body tissue, and the body tissue is irradiated with excited light corresponding to a fluorescent light wavelength of the reagent, and thus, a fluorescent image is obtained. The light source device 5157 can be configured to supply the narrow band light and/or the excited light corresponding to such special light imaging.

(Camera Head and CCU)

Figure 22:
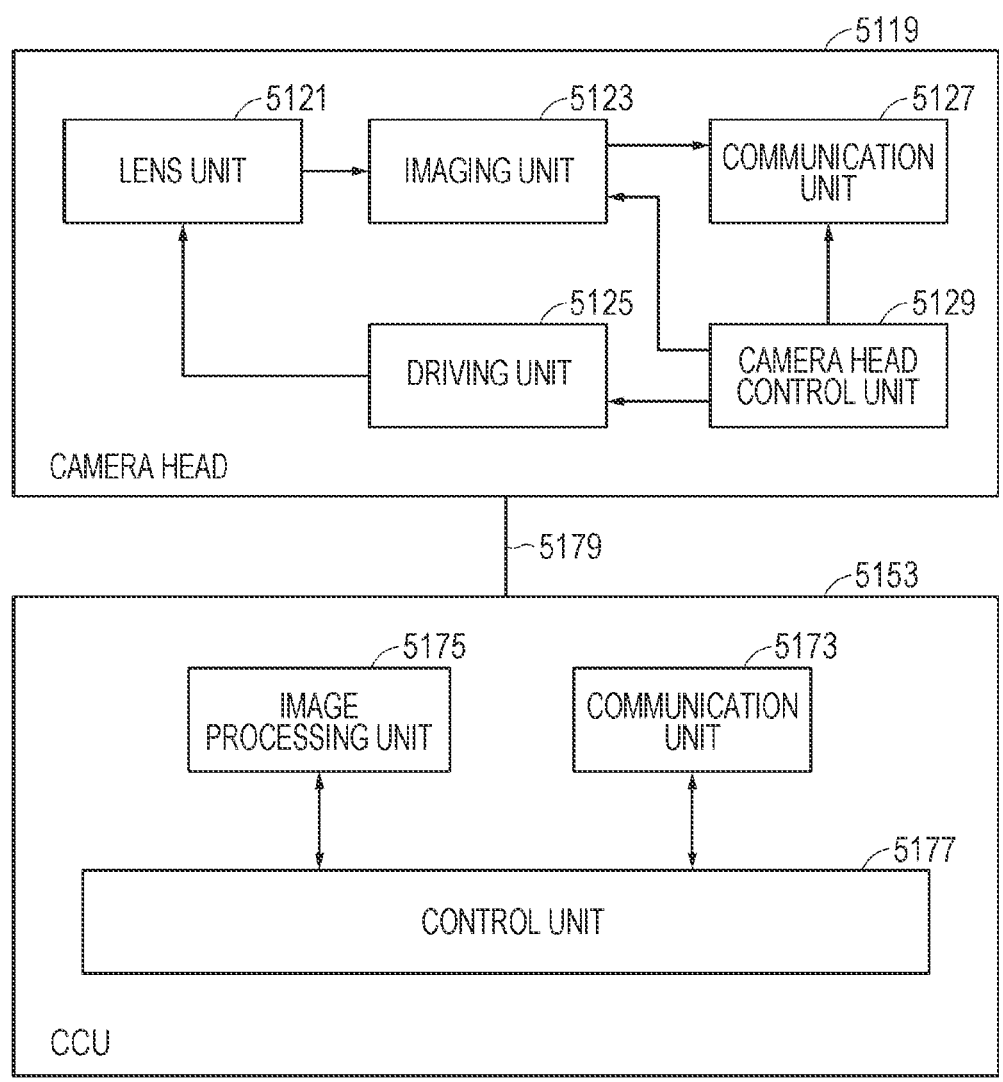
FIG. 22 is a block diagram illustrating an example of a functional configuration of a camera head and a CCU illustrated in FIG. 21.

The function of the camera head 5119 and the CCU 5153 of the endoscope 5115 will be described in more detail, with reference to FIG. 22. FIG. 22 is a block diagram illustrating an example of a functional configuration of the camera head 5119 and the CCU 5153 illustrated in FIG. 21.

With reference to FIG. 22, the camera head 5119 includes a lens unit 5121, an imaging unit 5123, a driving unit 5125, a communication unit 5127, and a camera head control unit 5129, as the function thereof. Furthermore, the CCU 5153 includes a communication unit 5173, an image processing unit 5175, and a control unit 5177, as the function thereof. The camera head 5119 and the CCU 5153 are connected to be capable of bidirectionally communicating with each other through a transmission cable 5179.

First, the functional configuration of the camera head 5119 will be described. The lens unit 5121 is an optical system provided in a connection portion with the lens tube 5117. Observation light incorporated from a tip end of the lens tube 5117, is guided to the camera head 5119, and is incident on the lens unit 5121. The lens unit 5121 includes a combination of a plurality of lenses including a zoom lens and a focus lens. Optical characteristics of the lens unit 5121 are adjusted such that the observation light is condensed on a light receiving surface of an image sensor of the imaging unit 5123. Furthermore, the zoom lens and the focus lens are configured such that the positions of the zoom lens and the focus lens on an optical axis can be moved in order to adjust the magnification and a focal point of the image.

The imaging unit 5123 includes an image sensor, and is arranged on the later stage of the lens unit 5121. The observation light passing through the lens unit 5121, is condensed on the light receiving surface of the image sensor, and an image signal corresponding to the observation image is generated by the photoelectric conversion. The image signal generated by the imaging unit 5123, is provided to the communication unit 5127.

For example, a complementary metal oxide semiconductor (CMOS) type image sensor, which is capable of performing color capturing having a Bayer array, is used as the image sensor configuring the imaging unit 5123. Note that, for example, an element capable of corresponding to high-definition image capturing of greater than or equal to 4K, may be used as the image sensor. The image of the surgery portion is obtained with a high definition, and thus, the surgery operator 5181 is capable of more specifically grasping the state of the surgery portion, and the surgery is capable of smoothly progressing.

Furthermore, the image sensor configuring the imaging unit 5123 includes a pair of image sensors for acquiring each of an image signal for a right eye and an image signal for a left eye, corresponding to the 3D display. The 3D display is performed, and thus, the surgery operator 5181 is capable of more accurately grasping the depth of the biological tissue in the surgery portion. Note that, in a case where the imaging unit 5123 has a multi-plate type configuration, a plurality of lens units 5121 is provided corresponding to each of the image sensors.

Furthermore, the imaging unit 5123 may not be necessarily provided in the camera head 5119. For example, the imaging unit 5123 may be provided immediately after the objective lens, in the lens tube 5117.

The driving unit 5125 includes an actuator, and moves the zoom lens and the focus lens of the lens unit 5121 along the optical axis by a predetermined distance, according to the control from the camera head control unit 5129. With this arrangement, it is possible to suitably adjust the magnification and the focal point of the image captured by the imaging unit 5123.

The communication unit 5127 includes a communication device for transmitting and receiving various information items with respect to the CCU 5153. The communication unit 5127 transmits the image signal obtained from the imaging unit 5123 to the CCU 5153 through the transmission cable 5179, as the RAW data. At this time, in order to display the image of the surgery portion with a low latency, it is preferable that the image signal is transmitted through optical communication. This is because at the time of the surgery, the surgery operator 5181 performs the surgery while observing the state of the affected part by the image, and thus, in order for a more secure and reliable surgery, a moving image of the surgery portion is required to be displayed in real time to the maximum extent. In a case where the optical communication is performed, in the communication unit 5127, a photoelectric conversion module converting an electrical signal into an optical signal, is provided. The image signal is converted into the optical signal by the photoelectric conversion module, and then, is transmitted to the CCU 5153 through the transmission cable 5179.

Furthermore, the communication unit 5127 receives a control signal for controlling the driving of the camera head 5119, from the CCU 5153. The control signal, for example, includes information associated with the imaging condition, such as information of designating a frame rate of the image, information of designating an exposure value at the time of the imaging, and/or information of designating the magnification and the focal point of the image. The communication unit 5127 provides the received control signal to the camera head control unit 5129. Note that the control signal from the CCU 5153 may be transmitted through the optical communication. In this case, in the communication unit 5127, a photoelectric conversion module converting the optical signal into an electrical signal, is provided, and the control signal is converted into the electrical signal by the photoelectric conversion module, and then, is provided to the camera head control unit 5129.

Note that the imaging condition such as the frame rate or the exposure value, the magnification, and the focal point, described above, is automatically set by the control unit 5177 of the CCU 5153, on the basis of the acquired image signal. That is, a so-called auto exposure (AE) function, an auto focus (AF) function, and an auto white balance (AWB) function are provided in the endoscope 5115.

The camera head control unit 5129 controls the driving of the camera head 5119, on the basis of the control signal from the CCU 5153 received through the communication unit 5127. For example, the camera head control unit 5129 controls the driving of the image sensor of the imaging unit 5123, on the basis of the information of designating the frame rate of the image and/or the information of designating the exposure at the time of the imaging. Furthermore, for example, the camera head control unit 5129 suitably moves the zoom lens and the focus lens of the lens unit 5121 through the driving unit 5125, on the basis of the information of designating the magnification and the focal point of the image. Moreover, the camera head control unit 5129 may have a function of storing information for identifying the lens tube 5117 or the camera head 5119.

Note that the lens unit 5121, the imaging unit 5123, and the like, are arranged in a sealed structure having high airtightness and waterproof properties, and thus, it is possible for the camera head 5119 to have resistance with respect to an autoclave sterilization treatment.

Next, the functional configuration of the CCU 5153 will be described. The communication unit 5173 includes a communication device for transmitting and receiving various information items with respect to the camera head 5119. The communication unit 5173 receives the image signal to be transmitted from the camera head 5119, through the transmission cable 5179. At this time, as described above, the image signal can be preferably transmitted through optical communication. In this case, in the communication unit 5173, a photoelectric conversion module converting an optical signal into an electrical signal, is provided corresponding to the optical communication. The communication unit 5173 provides the image signal converted into the electrical signal, to the image processing unit 5175.

Furthermore, the communication unit 5173 transmits the control signal for controlling the driving of the camera head 5119, to the camera head 5119. The control signal may be transmitted through the optical communication.

The image processing unit 5175 performs various image processing on the image signal which is the RAW data transmitted from the camera head 5119. For example, various known signal processing such as development processing, high-image quality processing (band emphasizing processing, super-resolution processing, noise reduction (NR) processing and/or shake correction processing, or the like), and/or magnification processing (electron zoom processing), are included as the image processing. Furthermore, the image processing unit 5175 performs detection processing on the image signal, in order to perform AE, AF, and AWB.

The image processing unit 5175 includes a processor such as a CPU or a GPU, and the processor is operated according to a predetermined program, and thus, the image processing or the detection processing, described above, can be performed. Note that, in a case where the image processing unit 5175 includes a plurality of GPUs, the image processing unit 5175 suitably divides information associated with the image signal, and performs the image processing in parallel, by the plurality of GPUs.

The control unit 5177 performs various controls relevant to the imaging of the surgery portion by the endoscope 5115, and the display of the image. For example, the control unit 5177 generates the control signal for controlling the driving of the camera head 5119. At this time, in a case where the imaging condition is input by the user, the control unit 5177 generates the control signal on the basis of the input of the user. Alternatively, in a case where the AE function, the AF function, and the AWB function are provided in the endoscope 5115, the control unit 5177 suitably calculates an optimal exposure value, a focal point distance, and a white balance, according to the result of the detection processing by the image processing unit 5175, and generates the control signal.

Furthermore, the control unit 5177 displays the image of the surgery portion on the display device 5155, on the basis of the image signal subjected to the image processing by the image processing unit 5175. At this time, the control unit 5177 recognizes various objects in the surgery portion image, by using various image recognition technologies. For example, the control unit 5177 detects the shape, the color, or the like of the edge of the object included in the surgery portion image, and thus, it is possible to recognize a surgical tool such as forceps, a specific biological portion, bleed, mist at the time of using the energy treatment tool 5135, and the like When the image of the surgery portion is displayed on the display device 5155, the control unit 5177 displays various surgery support information items to be superimposed on the image of the surgery portion, by using a recognition result. The surgery support information is displayed to be superimposed, and is presented to the surgery operator 5181, and thus, a more secure and reliable surgery is capable of progressing.

The transmission cable 5179 connecting the camera head 5119 and the CCU 5153 together, is an electrical signal cable corresponding to the communication of the electrical signal, an optical fiber corresponding to the optical communication, or a composite cable thereof.

Here, in the illustrated example, the communication is performed in a wired manner, by using the transmission cable 5179, but the communication between the camera head 5119 and the CCU 5153, may be performed in a wireless manner. In a case where the communication between the camera head 5119 and the CCU 5153 is performed in a wireless manner, it is not necessary that the transmission cable 5179 is laid in the surgery room, and thus, a problem can be solved, in which the movement of the medical staff in the surgery room is hindered by the transmission cable 5179.

An example of the surgery room system 5100 to which the technology according to the present disclosure can be applied, has been described. Note that, here, a case where the medical system to which the surgery room system 5100 is applied, is the endoscope surgery system 5113, has been described as an example, but the configuration of the surgery room system 5100 is not limited to such an example. For example, the surgery room system 5100 may be applied to a flexible endoscope system for a test or a microscope surgery system, instead of the endoscope surgery system 5113.

Of the configurations described above, the technology according to the present disclosure can be suitably applied to surgery using an endoscopic camera. Specifically, this is a case where a scopist who manually focuses the endoscopic camera in the operation adjusts the focus of the endoscopic camera while looking at a monitor different from the monitor that the doctor performing the operation views. In this case, peaking display using the present technology is performed only on the image displayed on the monitor viewed by the scopist, and no peaking display is performed on the image viewed by the doctor performing the operation. Thus, the operation of focusing the endoscopic camera on the affected part by the scopist can be facilitated without affecting the doctor performing the operation.

The present technology may be configured as below.

(1)

An image processing apparatus, in which a band of a filter configured to extract a high-frequency component from frequency characteristics of an image is adjusted according to a change in imaging setting.

(2)

The image processing apparatus according to (1), in which the imaging setting is zoom magnification.

(3)

The image processing apparatus according to (2), in which digital zoom and optical zoom are distinguished in a case of adjustment of the band of the filter according to the zoom magnification.

(4)

The image processing apparatus according to (2), in which reaction sensitivity with respect to the frequency characteristics of the image is adjusted as the peaking setting in a case where the zoom is optical zoom.

(5)

The image processing apparatus according to (4), in which the reaction sensitivity is increased in a case where magnification of the optical zoom is increased.

(6)

The image processing apparatus according to (2), in which in a case where the zoom is digital zoom, the band of the filter that extracts the high-frequency component from the frequency characteristics of the image is adjusted as the peaking setting.

(7)

The image processing apparatus according to (6), in which in a case where the magnification of the digital zoom is increased, the band of the filter is shifted to a low frequency side.

(8)

The image processing apparatus according to (1), in which the imaging setting is a setting that affects noise in the image.

(9)

The image processing apparatus according to claim (8), in which the setting that affects the noise is ISO sensitivity, and reaction sensitivity with respect to the frequency characteristics of the image is adjusted as the peaking setting.

(10)

The image processing apparatus according to (9), in which the reaction sensitivity is reduced in a case where the ISO sensitivity is increased.

(11)

The image processing apparatus according to (1), in which the imaging setting is image resolution, and, as the peaking setting, reaction sensitivity with respect to the frequency characteristics of the image and the band of the filter that extracts the high-frequency component from the frequency characteristics of the image are adjusted.

(12)

The image processing apparatus according to (11), in which in a case where the resolution is reduced, the band of the filter is shifted to a low frequency side.

(13)

The image processing apparatus according to (11), in which in a case where the resolution is reduced, the reaction sensitivity is reduced.

(14)

The image processing apparatus according to any of (1) to (13), in which the peaking setting is adjusted with reference to a table storing the peaking setting associated with each of a plurality of parameters of the imaging setting.

(15)

The image processing apparatus according to (14), in which in a case where the imaging setting changes to the parameter not stored in the table, the peaking setting corresponding to the parameter not stored in the table is calculated by interpolation calculation using the peaking setting stored in the table.

(16)

The image processing apparatus according to (13) or (14), in which in a case where a plurality of the imaging settings is changed, the peaking setting is adjusted with reference to the table storing the peaking setting associated with a combination of the plurality of the imaging settings.

(17)

The image processing apparatus according to any of (14) to (16), in which the plurality of parameters includes image resolution, optical zoom magnification, digital zoom magnification, and an amount of noise in the image.

(18)

The image processing apparatus according to any of (1) to (17), in which before conversion of resolution of an image subjected to peaking processing to display resolution, processing of thickening a marker for the peaking processing is performed.

(19)

An image processing method including:

adjusting a band of a filter that extracts a high-frequency component from frequency characteristics of an image according to a change in imaging setting.

(20)

An image processing program for causing a computer to execute an image processing method including:

adjusting a band of a filter that extracts a high-frequency component from frequency characteristics of an image according to a change in imaging setting.

REFERENCE SIGNS LIST

100 Imaging apparatus
200, 300 Peaking processing unit

The invention claimed is:

1. An image processing apparatus, comprising:
   a filter configured to extract a high-frequency component from frequency characteristics of an image, wherein peaking settings are adjusted by
   setting a band of the filter according to a change in image resolution in the image, and
   adjusting a peaking threshold according to the setting of the band of the filter and the change in the image resolution.

2. The image processing apparatus according to claim 1, wherein the band of the filter is set according to a change in a setting that affects noise in the image.

3. The image processing apparatus according to claim 2, wherein the change in the setting that affects the noise in the image is ISO sensitivity.

4. The image processing apparatus according to claim 3, wherein the peaking threshold is increased in a case where the ISO sensitivity is increased.

5. The image processing apparatus according to claim 1, wherein the band of the filter is set according to a change in the amount of noise in the image.

6. The image processing apparatus according to claim 1, wherein
   in a case where the image resolution is reduced, the band of the filter is shifted to a range of lower frequencies.

7. The image processing apparatus according to claim 1, wherein
   in a case where the image resolution is reduced, the peaking threshold is increased.

8. A non-transitory computer readable medium storing program code, the program code being executable by a processor to perform operations comprising:
   filtering an image to extract a high-frequency component from frequency characteristics of the image; and
   adjusting a peaking setting by
   setting a band of the filtering according to a change in image resolution in the image, and
   adjusting a peaking threshold according to the setting of the band of the filter and the change in the image resolution.

9. The non-transitory computer readable medium according to claim 8, further comprising:
   setting the band of the filtering according to a change in a setting that affects noise in the image.

10. The non-transitory computer readable medium according to claim 9, wherein the change in the setting that affects the noise in the image is ISO sensitivity.

11. The non-transitory computer readable medium according to claim 10, wherein the peaking threshold is reduced in a case where the ISO sensitivity is increased.

12. The non-transitory computer readable medium according to claim 8, further comprising:
   setting the band of the filtering according to a change in the amount of noise in the image.

13. The non-transitory computer readable medium according to claim 8, wherein
   in a case where the image resolution is reduced, the band of the filtering is shifted to a range of lower frequencies.

14. The non-transitory computer readable medium according to claim 8, wherein
   in a case where the resolution is reduced, the peaking threshold is increased.

15. An image processing method, comprising:
- filtering an image to extract a high-frequency component from frequency characteristics of the image; and
- adjusting a peaking setting by
- setting a band of the filtering according to a change in image resolution in the image, and
- adjusting a peaking threshold according to the setting of the band of the filter and the change in the image resolution.

16. The image processing method according to claim 15, wherein setting the band of the filtering is according to a change in a setting that affects noise in the image.

17. The image processing method according to claim 15, wherein setting the band of the filtering is according to a change in the amount of noise in the image.

18. The image processing method according to claim 15, wherein
- in a case where the image resolution is reduced, the band of the filtering is shifted to a range of lower frequencies.

19. The image processing method according to claim 15, wherein
- in a case where the resolution is reduced, the peaking threshold is increased.

* * * * *